US010681320B2

(12) United States Patent
Kotani et al.

(10) Patent No.: US 10,681,320 B2
(45) Date of Patent: Jun. 9, 2020

(54) PROJECTION APPARATUS, METHOD FOR CONTROLLING PROJECTION APPARATUS, AND NON-TRANSITORY STORAGE MEDIUM

(71) Applicant: CANON KABUSHIKI KAISHA, Tokyo (JP)

(72) Inventors: Junji Kotani, Inagi (JP); Hidetoshi Wada, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/990,418

(22) Filed: May 25, 2018

(65) Prior Publication Data

US 2018/0352205 A1 Dec. 6, 2018

Related U.S. Application Data

(60) Provisional application No. 62/519,726, filed on Jun. 14, 2017.

(30) Foreign Application Priority Data

Jun. 2, 2017 (JP) .................................. 2017-110277

(51) Int. Cl.
*H04N 9/31* (2006.01)
*G06T 3/40* (2006.01)
*G09G 5/00* (2006.01)

(52) U.S. Cl.
CPC ............ *H04N 9/3194* (2013.01); *G06T 3/40* (2013.01); *G09G 5/00* (2013.01); *H04N 9/3182* (2013.01);

(Continued)

(58) Field of Classification Search
CPC ........ H04N 9/3188; G06F 2203/04806; G09G 2340/045; G06T 3/40
See application file for complete search history.

(56) References Cited

U.S. PATENT DOCUMENTS

| 9,830,023 B2* | 11/2017 | Ichieda | .................. G06F 3/0425 |
| 2012/0163537 A1* | 6/2012 | Iwakiri | ................ A61B 6/4283 |
| | | | 378/62 |

(Continued)

FOREIGN PATENT DOCUMENTS

| JP | 2005-141151 A | 6/2005 |
| JP | 2010-130481 A | 6/2010 |

(Continued)

*Primary Examiner* — Paulos M Natnael
(74) *Attorney, Agent, or Firm* — Canon U.S.A., Inc. I.P. Division

(57) ABSTRACT

One or more projection apparatuses, control methods for one or more projection apparatuses, and storage mediums for use therewith are provided herein. At least one projection apparatus includes: a projection unit including an optical unit, the projection unit being configured to project a projection image including a predetermined display item onto a projection surface; a sensor configured to sense a predetermined area corresponding to the predetermined display item on the projection surface; and a control unit configured to: (i) perform predetermined processing relating to the projection image in response to the sensor detecting a predetermined instruction in the predetermined area, and (ii) stop sensing performed by the sensor in a case where a state of the optical system of the projection unit changes while the projection image including the predetermined display item is being projected.

23 Claims, 15 Drawing Sheets

(52) U.S. Cl.
CPC ......... *H04N 9/3185* (2013.01); *H04N 9/3188* (2013.01)

(56) References Cited

U.S. PATENT DOCUMENTS

| | | | | |
|---|---|---|---|---|
| 2012/0293776 A1* | 11/2012 | Keum | .................. | H04N 9/3194 353/85 |
| 2013/0141361 A1* | 6/2013 | Endo | .................. | G06F 3/04883 345/173 |
| 2014/0247343 A1* | 9/2014 | Chen | .................... | G02B 27/017 348/135 |
| 2015/0130847 A1* | 5/2015 | Masuoka | .................. | G09G 3/20 345/665 |
| 2017/0310937 A1* | 10/2017 | Wada | .................. | H04N 9/3179 |
| 2018/0015876 A1* | 1/2018 | Yamagata | ............ | G03B 21/142 |
| 2018/0343426 A1* | 11/2018 | Wada | .................. | H04N 9/3182 |
| 2018/0352205 A1* | 12/2018 | Kotani | ................. | H04N 9/3194 |

FOREIGN PATENT DOCUMENTS

| | | |
|---|---|---|
| JP | 2011-164878 A | 8/2011 |
| JP | 2013-097177 A | 5/2013 |
| JP | 2015-102737 A | 6/2015 |
| JP | 2016-012203 A | 1/2016 |
| WO | 2016/075796 A1 | 5/2016 |

\* cited by examiner

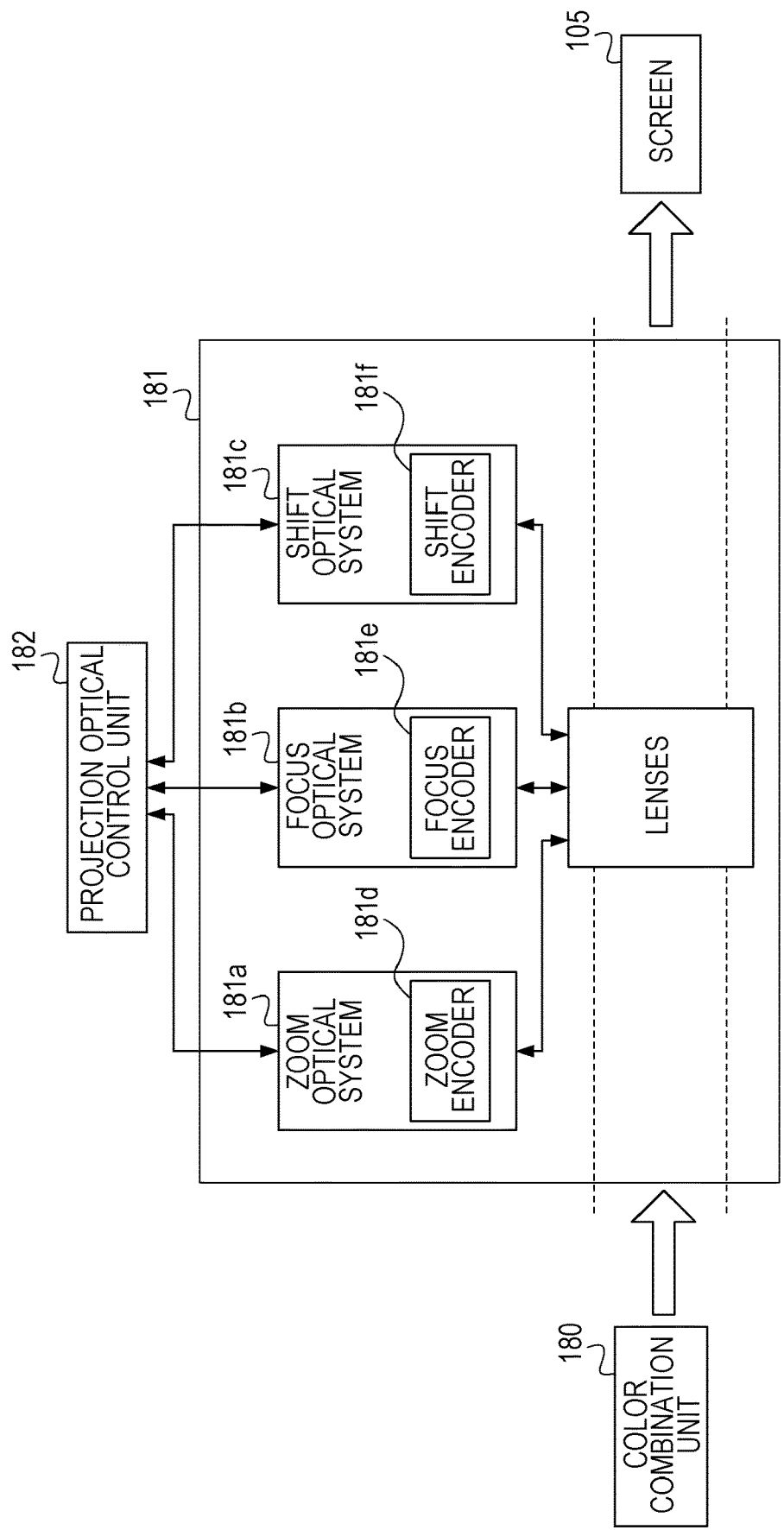

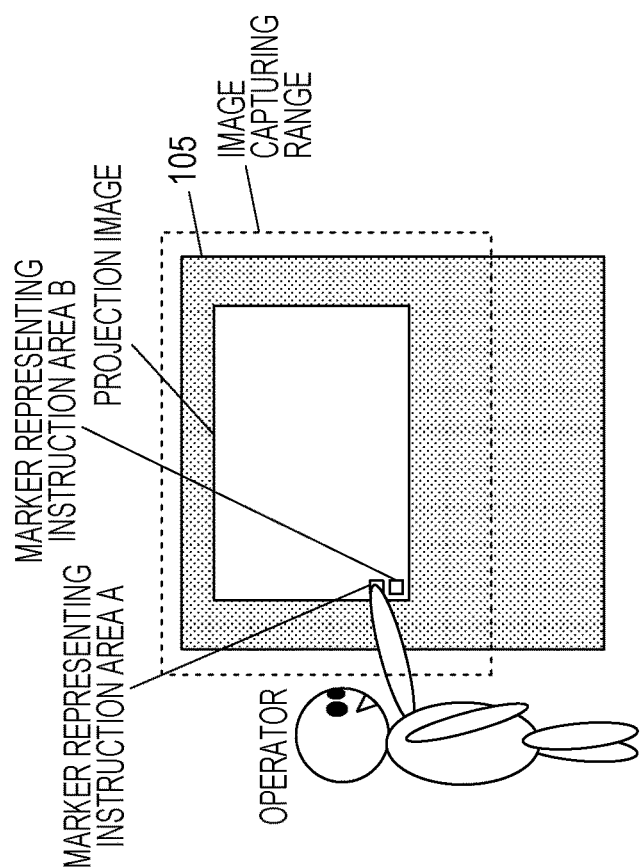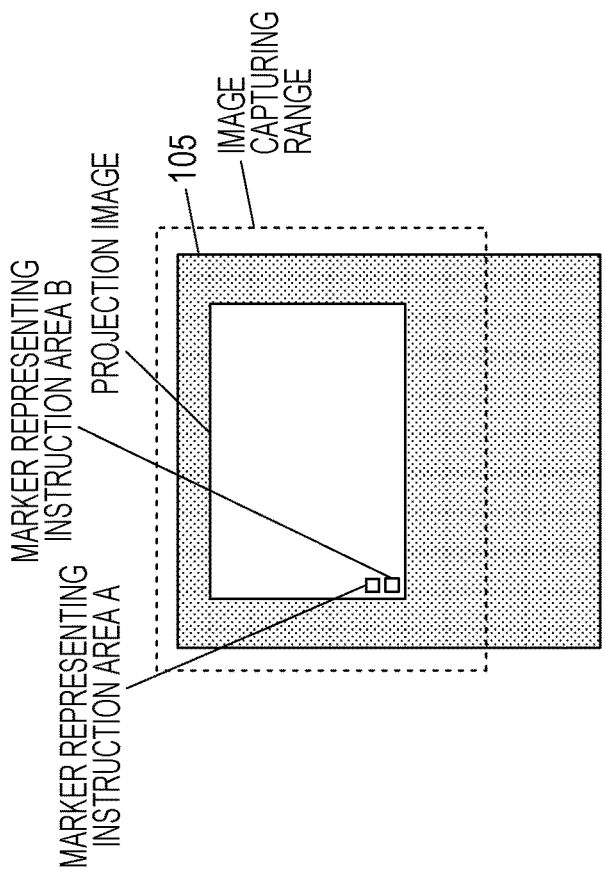

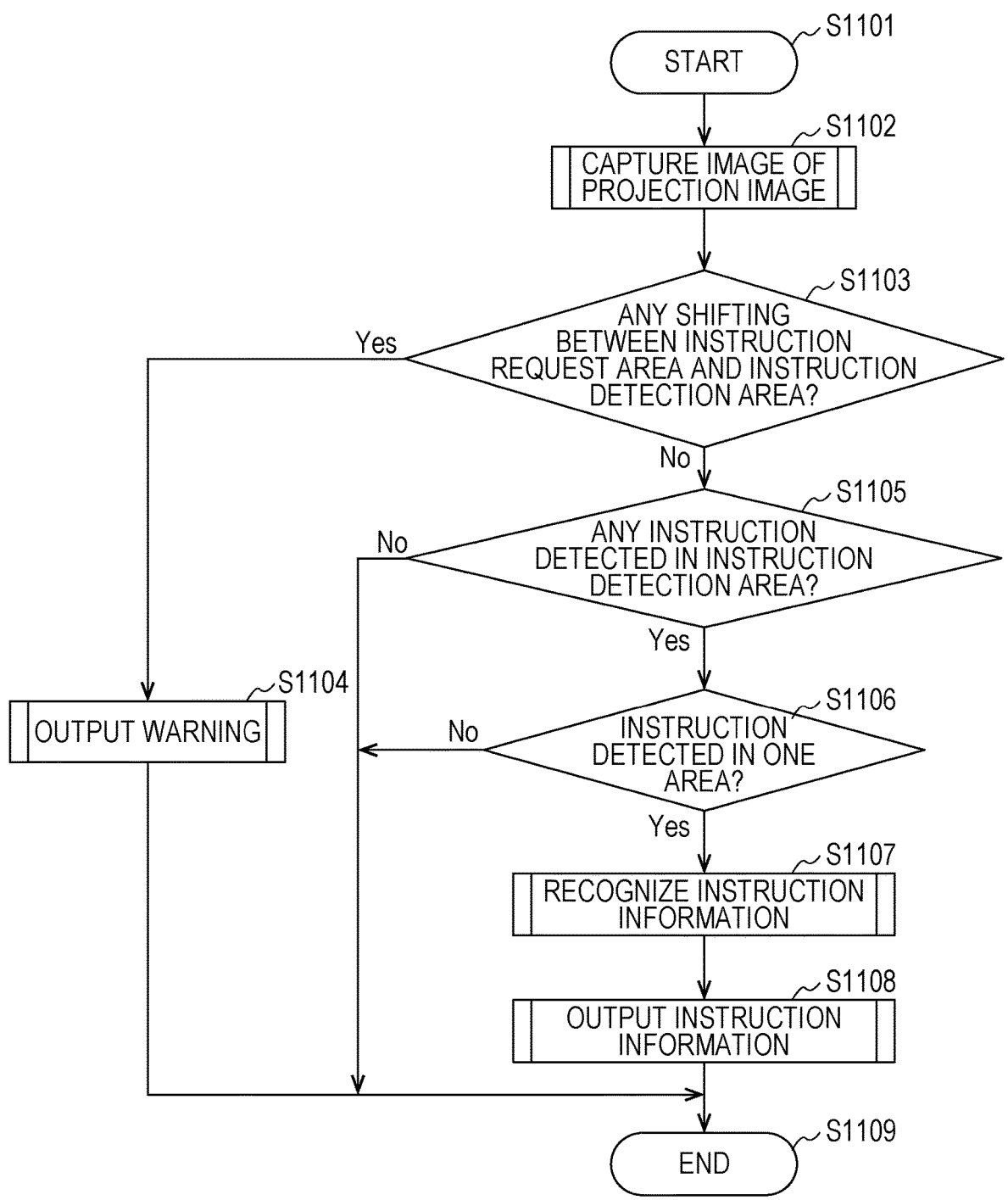

FIG. 12A
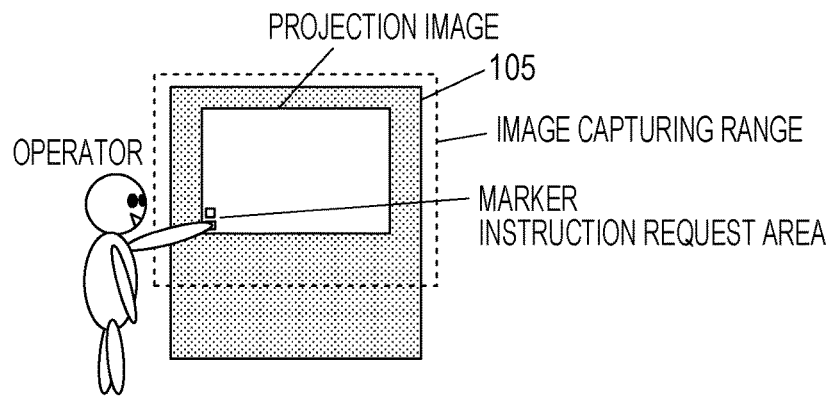
FIG. 12B  FIG. 12C  FIG. 12D
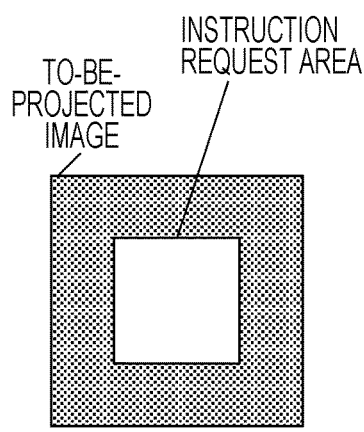 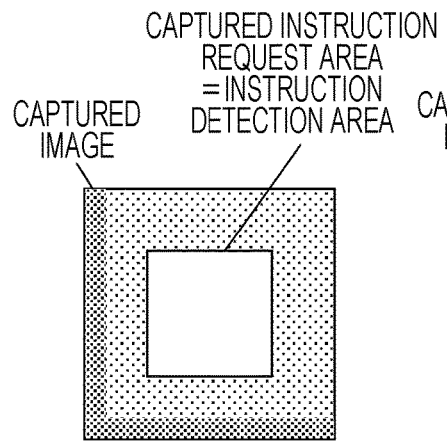 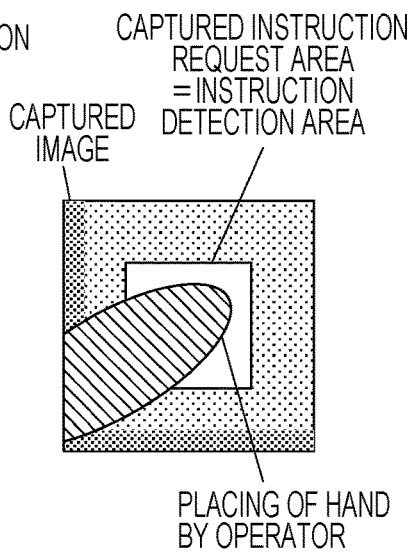

PROJECTION APPARATUS, METHOD FOR CONTROLLING PROJECTION APPARATUS, AND NON-TRANSITORY STORAGE MEDIUM

BACKGROUND OF THE INVENTION

Field of the Invention

The present disclosure relates to one or more embodiments of a projection apparatus that projects an image, a method for controlling a projection apparatus, and a storage medium for use therewith.

Description of the Related Art

When a presentation is given by projecting, onto a screen or the like, a material and image information using a projector that projects an image, the displayed image is sometimes switched. At that time, an operator (user) performs an operation using a keyboard or a mouse on a personal computer (PC), which sends a video image to the projector, so as to perform a page-down or page-up operation. Alternatively, a remote control that sends a page-down or page-up command to the PC is used for the operation.

However, to operate the keyboard or the mouse of the PC, the keyboard or the mouse needs to be brought close to the operator who is giving the presentation. Alternatively, another operator who operates the PC needs to be arranged, and the presenter needs to ask the operator of the PC to perform the page-related operation on the projected material.

Japanese Patent Laid-Open No. 2011-164878 discloses a technique for enabling a page-related operation on a material by projecting, using a projector, the material and a marker serving as a display item and by detecting, using a camera, an operator's hand placed over the marker.

On the other hand, the projector is capable of adjusting the projection position and zoom of an image and of adjusting the projection position and the projection shape, such as trapezoidal distortion correction. In addition, when the projector is not fixed and is just placed on a desk, for example, the projection direction of the projector is accidentally changed.

SUMMARY OF THE INVENTION

At least one embodiment of a projection apparatus according to at least one aspect of the present disclosure includes a projection unit including an optical unit, the projection unit being configured to project a projection image including a predetermined display item onto a projection surface; a sensor configured to sense a predetermined area corresponding to the predetermined display item on the projection surface; and a control unit configured to: (i) perform predetermined processing relating to the projection image in response to the sensor detecting a predetermined instruction in the predetermined area, and (ii) stop the sensing performed by the sensor in a case where a state of the optical system of the projection unit changes while the projection image including the predetermined display item is being projected.

According to other aspects of the present disclosure, one or more additional projection apparatuses, one or more control methods for at least one projection apparatus, and one or more storage mediums for use therewith are discussed herein. Further features of the present disclosure will become apparent from the following description of exemplary embodiments with reference to the attached drawings.

BRIEF DESCRIPTION OF THE DRAWINGS

FIG. 2B is a configuration diagram of at least one embodiment of a projection optical system.

FIGS. 3A and 3B are diagrams for describing a projection image, a captured image, and instruction areas.

FIG. 11 is a flowchart of at least one embodiment of an operation flow, or a method for controlling, the projector.

FIGS. 12A to 12D are diagrams for describing an instruction request area and an instruction detection area.

DESCRIPTION OF THE EMBODIMENTS

Figure 1:
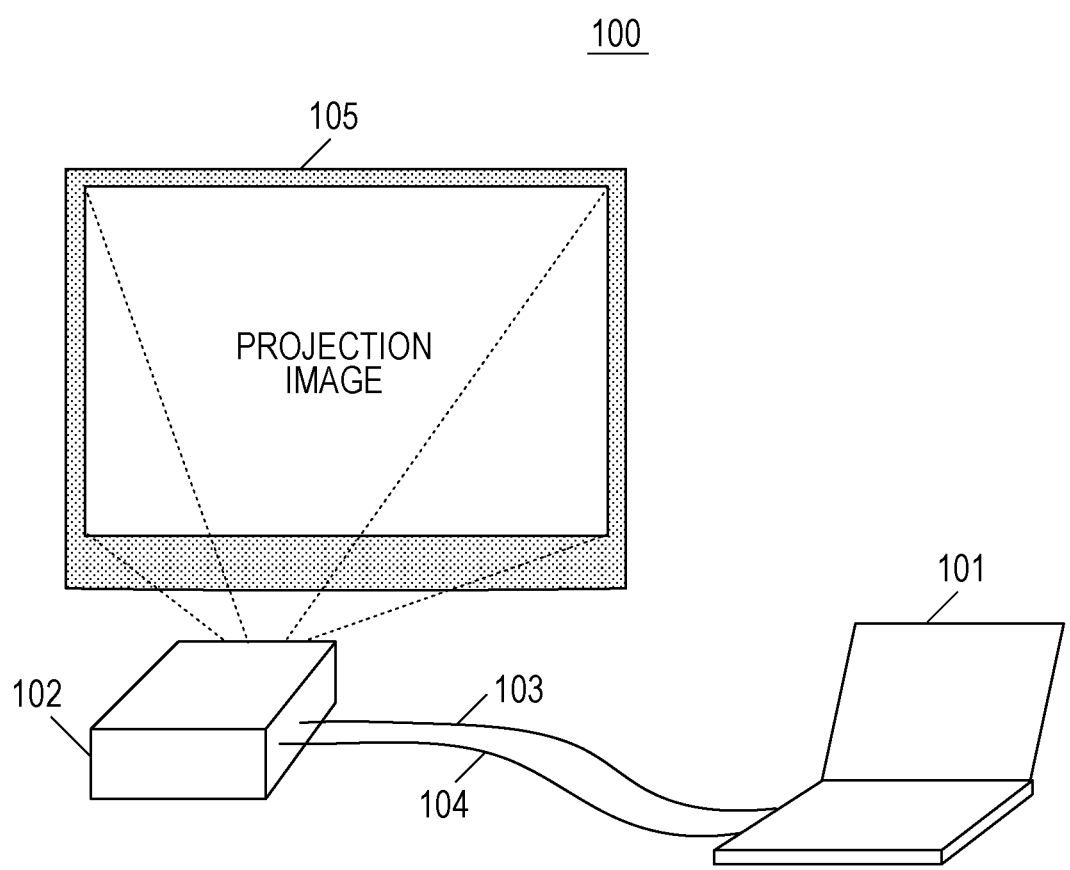
FIG. 1 is a perspective view of at least one embodiment of an image display system.

An overview of a projector that enables a page-related operation to be performed on a material by projecting, using a projector, the material and a marker serving as a display item and by detecting, using a camera, the operator's (user's) hand placed over the marker will be described herein.

FIGS. 3A and 3B are diagrams illustrating a projection image and markers. A marker representing an instruction area A and a marker representing an instruction area B are displayed in a projection image as illustrated in FIG. 3A. It is assumed that a page-up instruction is assigned to the instruction area A, and a page-down instruction is assigned to the instruction area B. If the operator places their hand over each of the instruction areas as illustrated in FIG. 3B, a camera built in the projector captures an image of an image capturing range, which is indicated by a dash line and includes the screen, the projection image, and the operator's hand, and detects whether the hand is placed over the instruction area A or B from the captured image. If it is detected that the hand is placed over an instruction area, the instruction corresponding to the instruction area is sent to the PC. FIGS. 3A and 3B illustrate two instruction areas using quadrangles. The operator is unable to determine an area over which the operator needs to place their hand to send an instruction unless some kind of marker is displayed for the instruction area in this manner. Thus, if marker images or the like serving as markings are projected to be superimposed on respective instruction request areas of the projection image, it becomes easier for the operator to issue an instruction. Images serving as markers are projected at such instruction request areas in this way. Such a technique can overcome these issues without requiring the operator to bring the keyboard or the mouse for operating the PC close to the operator, to ask another operator for an operation, or to add new hardware.

An imaging optical system having a fixed angle of view is often used as the camera in consideration for cost. The angle of view of the camera is selected to cover the maximum angle of view achieved by a zooming operation of a projection optical system and a maximum adjustment width achieved when a shift operation is performed on the projection image. In addition, the number of pixels is selected so that a required resolution is obtained.

Up to this point, an area in which the operator issues an instruction and the instruction is detected is referred to as an instruction area. In one or more embodiments, the projector may place a marker serving as a predetermined display item at such an instruction area in the projection image to request the operator for an instruction (to place their hand over). Hereinafter, an area at which the marker is placed in the projection image is referred to as an "instruction request area". On the other hand, to detect an instruction (placing of the hand) of the operator, the hand placed over the marker at the instruction request area may be detected in the captured image including the projection image in one or more embodiments. Preferably, in one or more embodiments, the hand placed over the marker is detected to detect an instruction. Hereinafter, an area in which the hand placed over is detected in the captured image is referred to as an "instruction detection area (sensing area)".

That is, projectors that support such a technique determine the instruction request area in a to-be-projected image and display a marker there, and also determine the instruction detection area (sensing area) corresponding to the marker in a captured image and detect the hand placed thereover. In one or more embodiments, it is essential that the instruction detection area be determined at the position of the instruction request area in the captured image. In one or more embodiments, the instruction request area and the instruction detection area may overlap or share at least one position.

Now, association between the instruction detection area and the instruction request area will be described.

After adjustment of the projection image is completed, the camera that is built in the projector and is configured to capture an image of the screen captures an image of the projection image projected onto the screen. Then, where the marker representing the instruction request area is located in the captured image is detected, and the instruction detection area in which the instruction is to be detected is set at the position of the instruction request area at which the marker detected in the captured image is located. In this way, the instruction request area and the request detection area overlap the same area in the captured image in one or more embodiments.

The reason for performing this operation is that, when viewed from the camera built in the projector, the position of the marker representing the instruction request area in the captured image changes depending on a relative positional relationship between the projector and the screen and a projection condition relating to zoom, shifting, etc. Thus, in one or more embodiments, the position of such an instruction detection area may be set in this way after adjustment of the size and position of the projection image and geometric correction are completed in installation of the projector and the screen.

This operation is referred to as calibration of the instruction request area and the instruction detection area.

This calibration of the instruction request area and the instruction detection area allows, if the operator places their hand over the instruction request area projected onto the screen, the projector to analyze an image of the instruction detection area in the captured image obtained by the camera and to detect the instruction given by the operator.

However, adjustment of the projection position of the image and the zoom is sometimes performed after installation of the projector and the screen and calibration of the instruction request area and the instruction detection area have completed and the operator has started an operation for giving an instruction by placing their hand over the instruction request area. Alternatively, the operator sometimes notices a trapezoidal distortion and corrects such a trapezoidal distortion again after having started such an operation. In addition, when the projector is not fixed and is just placed on a desk, for example, the projection direction of the projector is accidentally changed. At that time, if the positional relationship between the projector and the screen changes to cause a geometric distortion, the position of the projection image projected onto the screen may shift when viewed from the camera.

FIGS. 4A to 4D each illustrate the state after the size and position of the projection image are adjusted. The projection image and the marker images representing the instruction request areas, which are initially set, are denoted using dash lines. Images resulting from adjustment performed by the operator after the setup are denoted using solid lines.

Figure 4A:
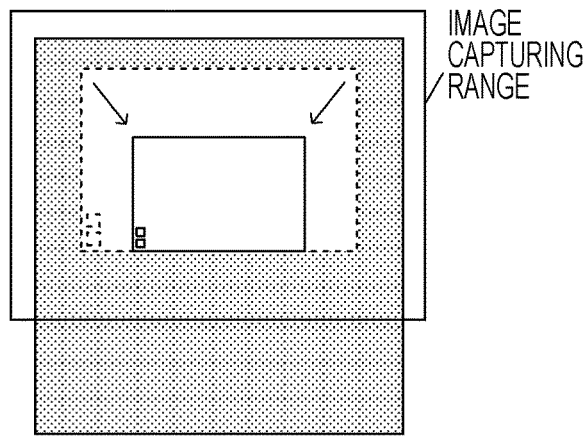
FIGS. 4A to 4D are diagrams for describing that the size and the position of the projection image may be adjusted in one or more embodiments.

FIG. 4A illustrates the case where the projection image is reduced in size by operating a zoom optical system of a projection optical unit or by image processing.

Figure 4B:
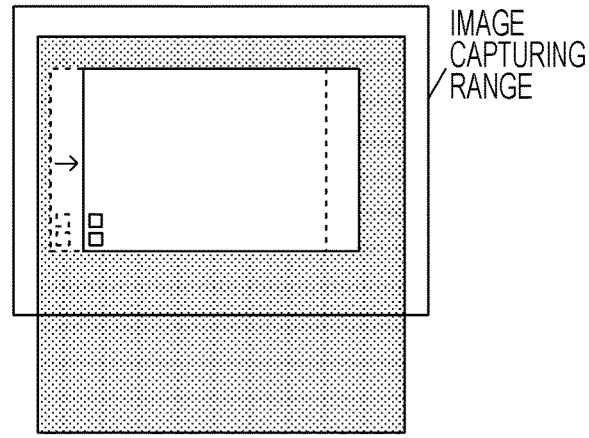

FIG. 4B illustrates the case where the position of the projection image is moved in the right direction by operating a shift optical system of the projection optical unit or by image processing.

Figure 4C:
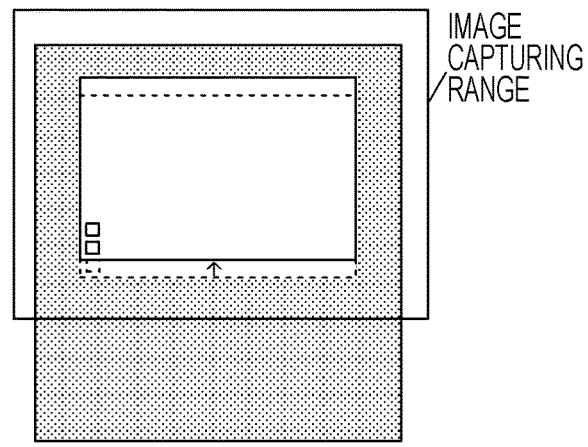

FIG. 4C illustrates the case where the position of the projection image is moved in the upper direction by operating the shift optical system of the projection optical unit or by image processing.

Figure 4D:
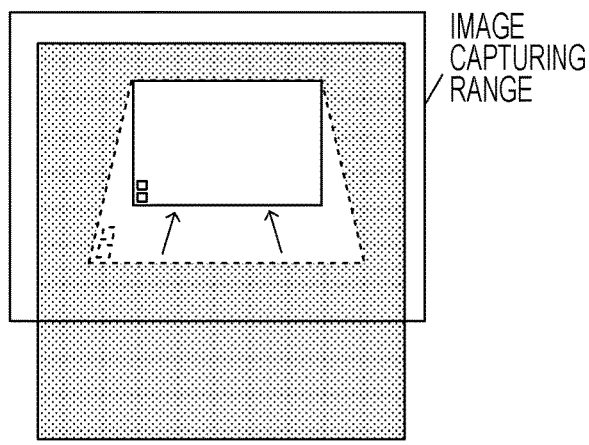

FIG. 4D illustrates the case where a trapezoidal distortion is corrected by image processing.

As illustrated in FIGS. 4A to 4D, the instruction request area at which the marker is displayed moves if a projection condition relating to zoom, shifting, or distortion correction is changed.

In this case, the instruction request area is moved, whereas the instruction detection area in the captured image is left untouched. Consequently, the association between these is no longer appropriate. Thus, if the operator places their hand over the marker image, which is the instruction request area that has been moved, to input an instruction, the projector attempts to detect the instruction given by the operator placing their hand in the instruction detection area set at the time of setup. As a result, the projector is no longer able to correctly detect the instruction given by the operator. At that time, since the operator can view only the marker whose position has been changed, erroneous detection of the operator's instruction may occur without the operator understanding the cause.

Accordingly, in view of the issue described above, the present disclosure provides at least one embodiment of a projection apparatus that reduces the occurrence of erroneous detection of an operator's instruction without the operator understanding the cause when a projection condition changes.

First Embodiment

Overall Configuration

Details of embodiments of the present disclosure will be described below with reference to the drawings. The present invention is not limited to the following embodiments. Note that the following embodiments do not limit the invention according to the claims, and all the combinations of features described in the embodiments are not necessarily mandatory to the solutions provided by the invention.

Each functional block described in the embodiment need not be a separate piece of hardware. That is, for example, functions of some functional blocks may be implemented by a single piece of hardware. A function of a single functional block or functions of a plurality of functional blocks may be implemented by a collaborative operation of some pieces of hardware. In addition, the function of each functional block may be implemented by a computer program loaded to a memory by a central processing unit (CPU).

In the embodiment, a system using a projector that has a display function using a transmissive liquid crystal panel and an illumination function will be described as an example of a projection display apparatus. However, the present invention is applicable to any system using a display device, such as a digital mirror device (DMD) or a liquid crystal on silicon (LCOS) (reflective liquid crystal) panel, as well as a projector using a transmissive liquid crystal panel as the display device. In addition, although a single-panel type and a three-panel type are generally known as types of liquid crystal projectors, either type may be used.

The description will be given of a liquid crystal projector by way of example in the following embodiment.

FIG. 1 is a perspective view of an image display system according to the embodiment.

As illustrated in FIG. 1, an image display system 100 includes a computer 101 serving as an image output apparatus and a projector 102. The computer 101 is, for example, a notebook personal computer. A display, which is a display device not illustrated, and a keyboard and a pointing device, which are input devices, are integrated into the computer 101. The projector 102 is supplied with image information via a video signal cable 103 from a video output port of the computer 101. The projector 102 projects an image based on this image information onto a projection surface of a screen 105.

In this embodiment, the computer 101 and the projector 102 are connected to each other via a Universal Serial Bus (USB) cable 104. The computer 101 receives a key operation command from the projector 102 via this USB cable 104.

Note that a cable including both the video signal cable 103 and a communication cable or a corresponding terminal may be used instead of using separate cables such as the video signal cable 103 and the USB cable 104.

Detailed Configuration of Projector

Figure 2A:
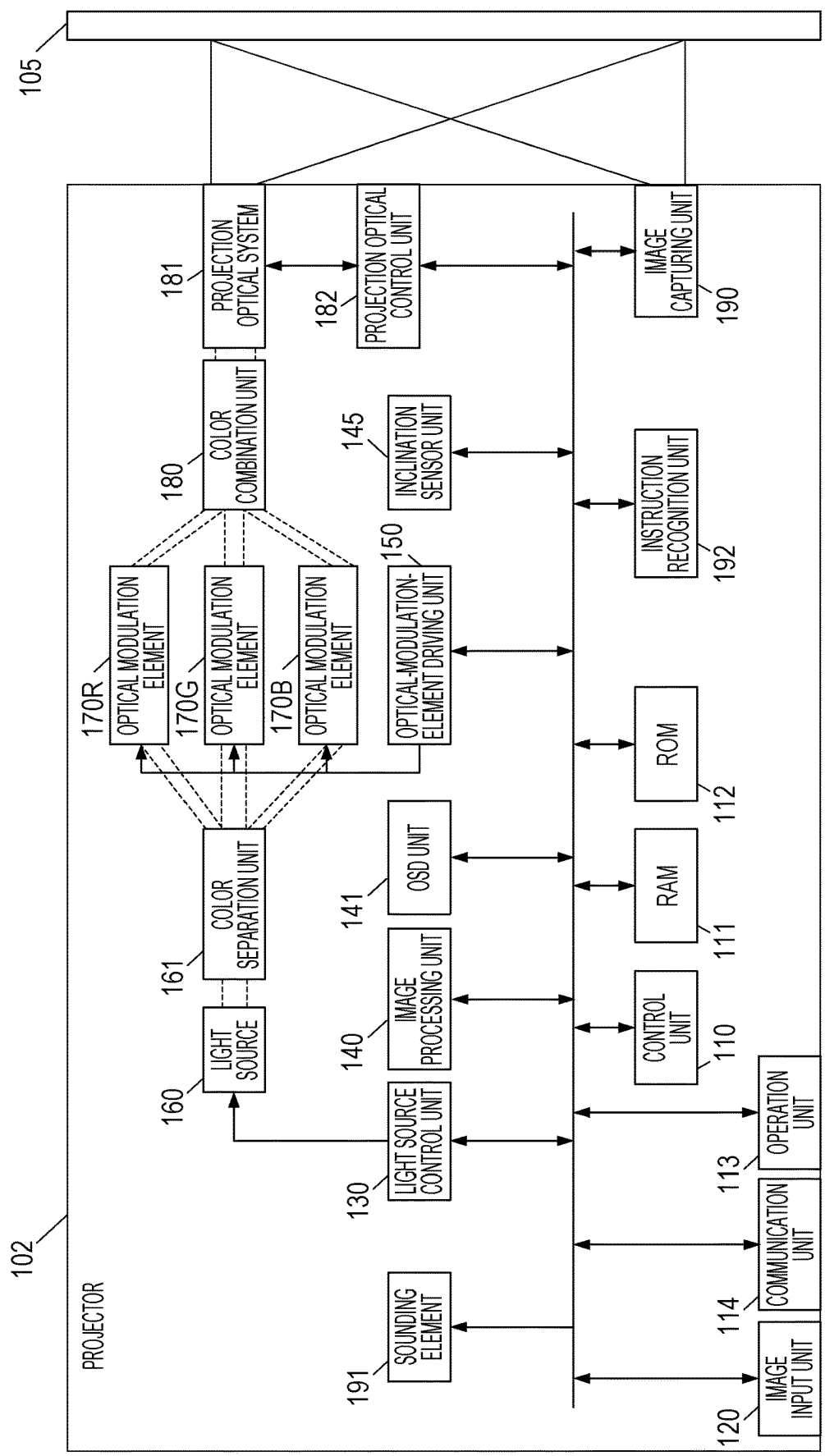
FIG. 2A is a configuration diagram of at least one embodiment of a projector.

FIG. 2A is a diagram illustrating an overall configuration of the projector 102 according to the embodiment. FIG. 2B is a diagram illustrating a configuration of a projection optical system 181 according to the embodiment.

The projector 102 according to the embodiment includes a control unit 110, a random access memory (RAM) 111, a read-only memory (ROM) 112, an operation unit 113, an image input unit 120, and an image processing unit 140. The projector 102 also includes an optical-modulation-element driving unit 150, optical modulation elements 170R, 170G, and 170B, a light source control unit 130, a light source 160, a color separation unit 161, a color combination unit 180, a projection optical control unit 182, and the projection optical system 181.

The control unit 110 is a processor that controls individual operation blocks of the projector 102. The ROM 112 stores a control program that describes a processing procedure performed by the control unit 110. The RAM 111 serves as a work memory and temporarily stores the control program and data. The control unit 110 is also capable of temporarily storing sill image data or moving image data received via a communication unit 114 and of reproducing an image or a video image based thereon by using a program stored in the ROM 112.

In addition, the control unit 110 performs control on an instruction recognition unit 192 (described later), which recognizes an operator's placing of their hand, to change an instruction recognition condition or to stop instruction recognition. The control unit 110 receives, as information used for controlling the instruction recognition unit 192 (described later), image processing parameter information from the image processing unit 140 (described later) and an orientation (inclination information) of a housing from an inclination sensor unit 145 (described later). The control unit 110 further receives an encoder output of the projection optical system 181 (described later) from the projection optical control unit 182 (described later), a captured image from an image capturing unit 190 (described later), etc. Details will be described later.

The control unit 110 performs processing on the projection image that is projected by the projection optical system 181, in response to the instruction recognition unit 192 detecting a predetermined instruction in the instruction detection area. For example, it is assumed that the processing on the projection image is processing of outputting a signal instructing for changing an image (image data) sent by an external apparatus to the external apparatus. Details will be described later.

The operation unit 113 accepts an instruction from the operator and sends an instruction signal to the control unit 110. The operation unit 113 includes a plurality of operation keys. Typical operation keys are a power button, an input selection button used to select a type of an input video signal or an input terminal, a menu button used to display a menu image for various settings, four arrow buttons used to select a setting item on the menu image, and an enter button.

The operation unit 113 may be, for example, a signal reception unit (such as an infrared reception unit) that receives a signal from a remote control, and may send a predetermined instruction signal to the control unit 110 on the basis of the received signal. The control unit 110 also receives a control signal input from the operation unit 113 or the communication unit 114 and controls individual operation blocks of the projector 102.

The image input unit 120 receives an image sent from an external apparatus. Herein, the external apparatus may be any apparatus capable of outputting an image signal, such as a personal computer, a camera, a mobile phone, a smartphone, a hard disk recorder, or a game machine. The image input unit 120 is further capable of loading an image recorded on a medium, such as a USB flash memory or an SD card. As described above, the image input unit 120 and the communication unit 114 may be constituted by the same cable or terminal.

The image processing unit 140 performs processing for changing the number of frames, the number of pixels, the pixel values, the image shape, etc. on the image signal received from the image input unit 120 and sends the resultant image signal to the optical-modulation-element driving unit 150. The image processing unit 140 includes, for example, a microprocessor for image processing. Note that the image processing unit 140 need not include a dedicated microprocessor. For example, the control unit 110 may perform processing similar to that of the image processing unit 140 based on a program stored in the ROM 112. The image processing unit 140 is capable of carrying out functions such as frame subsampling processing, frame interpolation processing, resolution conversion (scaling) processing, distortion correction processing (trapezoidal distortion correction processing), luminance correction processing, and color correction processing. The image processing unit 140 is also capable of generating a desired test pattern image and sending the desired test pattern image to the optical-modulation-element driving unit 150. In addition, the image processing unit 140 is capable of sending a character or a figure generated by an on screen display (OSD) unit 141 to the optical-modulation-element driving unit 150 as it is or after superimposing the character or the figure onto an input image. Further, the image processing unit 140 is capable of performing the above-described processing for changing on an image or a video image reproduced by the control unit 110 as well as the image signal received from the image input unit 120.

The optical-modulation-element driving unit 150 controls voltages to be applied to liquid crystals of pixels of the optical modulation elements 170R, 170G, and 170B on the basis of the image signal output from the image processing unit 140 to adjust transmittances of the optical modulation elements 170R, 170G, and 170B.

The optical modulation element 170R is an optical modulation element for red and adjusts a transmittance for red light among red (R) light, green (G) light, and blue (B) light that are separated by the color separation unit 161 from light emitted from the light source 160. The optical modulation element 170G is an optical modulation element for green and adjusts a transmittance for green light among red (R) light, green (G) light, and blue (B) light that are separated by the color separation unit 161 from light emitted from the light source 160. The optical modulation element 170B is an optical modulation element for blue and adjusts a transmittance for blue light among red (R) light, green (G) light, and blue (B) light that are separated by the color separation unit 161 from light emitted from the light source 160.

The light source control unit 130 controls on/off of the light source 160 and controls an amount of light. The light source control unit 130 includes a microprocessor for control. The light source control unit 130 need not include a dedicated microprocessor. For example, the control unit 110 may perform processing similar to that of the light source control unit 130 based on a program stored in the ROM 112. In addition, the light source 160 emits light used to project an image onto a screen not illustrated. The light source 160 may be, for example, a halogen lamp, a xenon lamp, a high-pressure mercury lamp, or the like. The color separation unit 161 separates light emitted from the light source 160 into red (R), green (G), and blue (B). The color separation unit 161 includes, for example, a dichroic mirror or a prism. When LEDs for the respective colors are used as the light source 160, the color separation unit 161 is not needed.

The color combination unit 180 combines together the red (R) light, the green (G) light, and the blue (B) light that respectively have passed through the optical modulation elements 170R, 170G, and 170B. The color combination unit 180 includes, for example, a dichroic mirror or a prism. Light obtained as a result of the color combination unit 180 combining the red (R) component, the green (G) component, and the blue (B) component together is sent to the projection optical system 181. At that time, the optical modulation elements 170R, 170G, and 170B are controlled by the optical-modulation-element driving unit 150 so as to have transmittances for light corresponding to the image input from the image processing unit 140. Thus, when the light combined by the color combination unit 180 is projected onto a screen by the projection optical system 181, an image corresponding to the image input from the image processing unit 140 is displayed on the screen.

The projection optical control unit 182 controls the projection optical system 181 serving as a projection unit. The projection optical control unit 182 includes a microprocessor for control. The projection optical control unit 182 need not include a dedicated microprocessor. For example, the control unit 110 may perform processing similar to that of the projection optical control unit 182 based on a program stored in the ROM 112.

In addition, the projection optical system 181 is a projection unit that projects the combined light output from the color combination unit 180 onto a screen. The projection optical system 181 includes a plurality of lenses, actuators for driving the lenses, and position encoders for the lenses. The projection image can be enlarged, reduced, or shifted or the focus of the projection image can be adjusted by driving the lenses using the actuators. In addition, the enlargement ratio, the focal position, and the shift amount of the projection image can be detected by determining the positions of the lenses by using the position encoders. That is, the projection optical system 181 corresponds to a projection unit configured to project a projection image including a marker (described later) onto a projection surface. As described in FIG. 2B, the projection optical system 181 includes a zoom optical system 181a, a focus optical system 181b, and a shift optical system 181c. The zoom optical system 181a includes a zoom encoder 181d. The focus optical system 181b includes a focus encoder 181e. The shift optical system 181c includes a shift encoder 181f.

Note that the projection optical system 181 may be configured not to include the actuators that drive the lenses in one or more embodiments of the present disclosure. In such a case, the focus optical system 181b, the zoom optical system 181a, and the shift optical system 181c of the projection optical system 181 are provided with handles for manual operation to allow the operator to perform a physical operation. In this case, cost for the actuators and the projection optical control unit 182 and the number of components can be reduced. Note that if a switch or the like that detects an operation of such a handle is provided, an operation on the focus optical system 181b, the zoom optical system 181a, or the shift optical system 181c and a change in the projection condition are successfully recognized by the control unit 110.

Note that the projection optical system 181 may be configured not to include the position encoders that detect the positions of the lenses in one or more embodiments of the present disclosure. In this case, cost for the position encoders or the projection optical control unit 182 and the number of components can be reduced.

The inclination sensor unit 145 is, for example, a sensor that measures an acceleration or a gravitational direction of the projector. The control unit 110 is able to detect the installation angle of the projector 102 by using the inclination sensor unit 145. In this way, the control unit 110 is able to estimate an amount of trapezoidal distortion caused as a result of installation of the projector 102 with an angle and to instruct the image processing unit 140 to perform image processing for correcting the trapezoidal distortion.

Note that a configuration without the inclination sensor unit 145 may be used in one or more embodiments of the present disclosure. In such a case, the control unit 110 may accept an amount of correction for the trapezoidal distortion input by the operator via the operation unit 113 and may instruct the image processing unit 140 to perform correction based on the input. In this case, cost for the inclination sensor unit 145 and the number of components can be reduced. Alternatively, the control unit 110 may calculate an amount of correction for the trapezoidal distortion based on an image captured by the image capturing unit 190.

The communication unit 114 receives a control signal, still image data, moving image data, etc. from an external apparatus. The communication unit 114 may use, for example, a wireless local area network (LAN), a wired LAN, USB, or Bluetooth (registered trademark). The communication scheme is not particularly limited. In addition, if the terminal of the image input unit 120 is, for example, a high-definition media interface (HDMI) (registered trademark) terminal, the communication unit 114 may perform CEC communication via the terminal. The external apparatus may be any apparatus, such as a personal computer, a camera, a mobile phone, a smartphone, a hard disk recorder, a game machine, or a remote control as long as the apparatus is capable of communicating with the projector 102.

In this embodiment, the communication unit 114 includes a USB terminal not illustrated and is connected to an external host apparatus via the USB cable 104. In this embodiment, the communication unit 114 is connected to the computer 101, and the control unit 110 sends a key operation command described later to the computer 101.

Note that the image processing unit 140, the optical-modulation-element driving unit 150, the light source control unit 130, and the projection optical control unit 182 of this embodiment may be constituted by a single microprocessor or a plurality of microprocessors capable of performing processing similar to the processing performed by these blocks. Alternatively, for example, the control unit 110 may perform processing similar to the processing performed by these blocks based on programs stored in the ROM 112.

The image capturing unit 190 includes a camera. The image capturing unit 190 is built in the projector 102 so as to capture an image of the screen 105 onto which the projection optical system 181 projects an image. The image capturing unit 190 captures an image of a range including the image projected by the projection optical system 181 onto the screen 105 on the basis of an instruction from the control unit 110. At that time, the image capturing unit 190 captures an image also including information obtained when the operator performs some kind of operation on the image projected onto the screen 105. For example, as illustrated in FIG. 3B, the image capturing unit 190 captures an image of a range indicated by a dash line, including the state in which the operator places their hand over the instruction area. Information concerning the image captured by the image capturing unit 190 is output to the control unit 110 and the instruction recognition unit 192.

Note that an operation of placing the hand performed by the operator may be detected with a sensor that uses another sensing technique, such as infrared or ultrasound. In this embodiment, an imaging sensor is used as a sensor configured to sense a range including a projection image that is being projected.

The instruction recognition unit 192 includes a microcomputer and recognizes the operator's placing of their hand. The instruction recognition unit 192 need not include a dedicated microprocessor. For example, the control unit 110 may perform processing similar to the processing performed by the instruction recognition unit 192 based on a program stored in the ROM 112. The instruction recognition unit 192 detects an instruction given as a result of the operator placing their hand in the instruction detection area of the captured image by analyzing image information obtained by the image capturing unit 190 through image capturing. That is, the image capturing unit 190 and the instruction recognition unit 192 correspond to a sensor (sensing unit) configured to perform sensing as to whether a predetermined instruction (operation) is given (performed) at an instruction detection area in a captured image. Detection of an instruction given through placing of a hand will be described later. Upon detecting an instruction given through placing of a hand, the instruction recognition unit 192 sends the result to the control unit 110. In addition, the instruction recognition unit 192 is controlled by the control unit 110 to change the detection operation. Details will be described later.

Upon receipt, from the instruction recognition unit 192, of information indicating detection of an instruction given through placing of a hand, the control unit 110 determines a key operation command corresponding to the instruction and sends the key operation command to the computer 101 via the communication unit 114. A method for determining this key operation command will be described later. In this embodiment, the communication unit 114 is a USB terminal since the communication unit 114 delivers information to the computer 101 via USB as described in FIG. 1. Needless to say, communication performed between the projector 102 and the computer 101 is not limited to USB communication. Note that, for example, presentation application software has already been started in the computer 101 that receives the key operation command via the USB cable 104. Thus, the computer 101 performs an operation on the application software in accordance with the received key operation command. The operation is, for example, a page-down or page-up operation. Needless to say, operations other than these operations, such as an operation for instructing for a list of images and an operation for finishing the presentation, can also be performed.

Initial Setup Flow of Projector

An initial setup of this projector will be described first.

Details of the initial setup include installation of the projector 102 and the screen 105, setup of an instruction function, and calibration of the instruction function in a use environment. The initial setup is performed by the operator.

The operator first installs the projector 102 and the screen 105. The operator then connects the projector 102 to the computer 101, which is an image output apparatus, using the video signal cable 103 and the USB cable 104. In this way, an image is supplied to the projector 102 from the computer 101 via the video signal cable 103.

Thereafter, the operator operates the operation unit 113 to input a start instruction, in response to which the projector 102 projects an image onto the screen 105. The operator then operates the operation unit 113 to set the image quality in the image processing unit 140 and to adjust the size of the projection image in the zoom optical system 181a, the focus in the focus optical system 181b, and the projection position in the shift optical system 181c in the projection optical system 181.

A trapezoidal distortion is caused when the projector 102 does not face the screen 105 straight. In such a case, the operator operates the operation unit 113 to correct the trapezoidal distortion using the trapezoidal distortion correction function of the image processing unit 140. Alternatively, the control unit 110 may give an instruction for correcting the trapezoidal distortion to the image processing unit 140 based on the inclination angle of the projector 102 detected by the inclination sensor unit 145.

Once installation of the projector 102 and the screen 105 completes, the operator sets the instruction function.

The setup of the instruction function includes selection of the number of instruction request areas, selection of markers serving as display items to be displayed for the respective instruction request areas, assignment of key operation commands (to be sent to the computer 101) to the respective instruction request areas, and assignment of positions to the respective instruction request areas in the projection image. This setup is performed by the operator via the operation unit 113. The control unit 110 receives such setting information and stores the setting information in the RAM 111. In the case of FIG. 3A, an example of this setup is such that the number of instruction request areas is two, each marker has, for example, a quadrangular shape, the key operation commands are page-down and page-up commands, and assigned positions are the illustrated areas A and B.

This setup may be performed by the operator every time or preset settings may be stored in the ROM 112. Alternatively, a plurality of preset settings (for example, a lower left set and a lower right set of the projection image) may be prepared, and the operator may select one of the preset settings.

Once the setup of the instruction function completes, the operator calibrates the instruction function in the use environment. The calibration of the instruction function in the use environment includes calibration of the instruction request areas and the instruction detection areas and calibration of brightness of the instruction request areas and the instruction detection areas.

The operator first operates the operation unit 113 to input an instruction for starting calibration of the instruction request areas and the instruction detection areas. In this calibration, an image of a projection image including markers representing instruction areas is captured, and the positions of the markers in the captured image are detected.

Figure 6A:
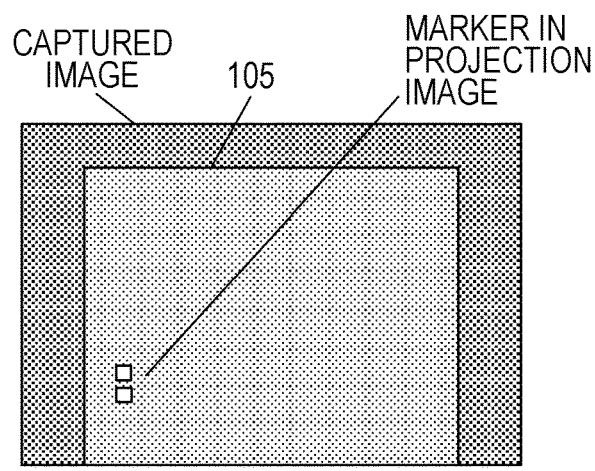
FIGS. 6A to 6C are diagrams for describing a method for detecting a position of a marker in the captured image.

Upon receipt of the calibration start instruction, the control unit 110 causes the OSD unit 141 to add markers serving as display items representing the instruction request areas to a display image to be projected and causes the projection optical system 181 to project the display image onto the screen. The control unit 110 then causes the image capturing unit 190 to capture an image of an area including the image projected by the projection optical system 181 onto the screen 105 as indicated by the dash line in FIG. 3A. FIG. 6A illustrates an example of the captured image. As illustrated, the captured image includes the projection image, the markers included in the projection image, the screen 105 located therearound, and other areas. The control unit 110 stores this captured image in the RAM 111.

Figure 6B:
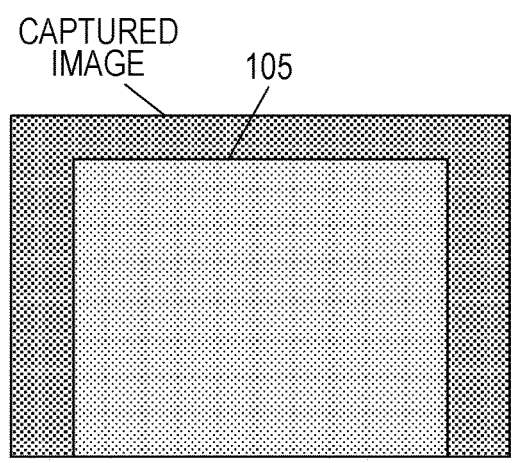

Then, the control unit 110 causes the OSD unit 141 to remove the markers representing the instruction request areas from the display image to be projected and causes the projection optical system 181 to project the display image onto the screen. FIG. 6B illustrates the captured image obtained when the markers are not projected, and an image of the screen 105 not including the markers is captured. The control unit 110 stores this captured image in the RAM 111.

Figure 6C:
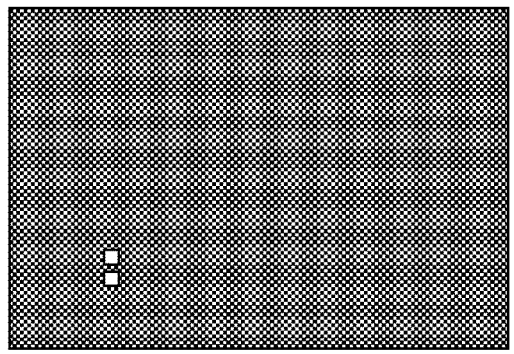

Then, the control unit 110 calculates a difference between the stored image of FIG. 6A and the stored image of FIG. 6B that are read from the RAM 111. FIG. 6C illustrates an image obtained by calculating the difference. Only the markers representing the instruction request areas are successfully detected.

The control unit 110 stores position information of each of the instruction request areas represented by the detected positions of the markers in the RAM 111 as position information of a corresponding instruction detection area. Note that the position information of the instruction detection area stored in the RAM 111 is read and used by the instruction recognition unit 192 later.

Note that a method for detecting a position of a marker other than this method may be used. For example, another test pattern may be used in place of the aforementioned markers. For example, the control unit 110 causes the OSD unit 141 to generate a test pattern in which some outermost pixels representing the angle of view of the projection image are projected in white or a given color and the rest of the area is projected in black in place of the aforementioned markers and causes the test pattern to be projected. In this way, an area of the projection image that is included in the captured image can be determined. On the other hand, relative positions of the markers corresponding to the respective instruction request areas in the projection image in which the markers are placed are known (the positions have been input by the operator during the setup of the instruction function). Thus, the instruction detection areas in the captured image can be determined by applying the relative positions to the captured image. Alternatively, the control unit 110 may cause the OSD unit 141 to project and display a plurality of patterns whose positions in the projection image are known and are different from one another. By capturing images of such patterns, areas of the projection images included in the captured images can be determined similarly. As described above, any method may be used as long as where the projection image is located in the captured image is determined using the method.

As described above, the control unit 110 detects the positions of the instruction request areas in the captured image and determines the positions of the instruction detection areas so that the instruction request areas match the respective instruction detection areas in the captured image. In this way, the control unit 110 completes calibration of the instruction request areas and the instruction detection areas.

Subsequently, the control unit 110 calibrates brightness of the instruction request areas and the instruction detection areas. The instruction given by the operator is detected by detecting placing of the hand over the marker representing the instruction request area. For example, this detection may be performed by comparing the total sum of pixel values of the instruction request area in the image to be projected with the total sum of pixel values of the instruction detection area in the captured image. In this calibration, a correction coefficient for correcting a difference in brightness between the instruction request area and the instruction detection area is calculated for this comparison.

First, the difference in brightness between the instruction request area and the instruction detection area will be described using FIGS. 12A to 12D.

FIG. 12A illustrates a state in which the operator places their hand over the marker representing the instruction request area in the projection image projected onto the screen 105. In FIG. 12A, the operator places their hand over one of the two markers.

FIG. 12B is a diagram illustrating an area also including the peripheral portion of the marker in the to-be-projected image output from the image processing unit 140. The instruction request area is present as a quadrangular marker.

FIG. 12C is a diagram illustrating an area also including the peripheral portion of the marker in the captured image output from the image capturing unit 190. The marker representing the instruction request area is present as a quadrangular marker.

Since calibration is performed on the instruction request area and the instruction detection area as described above, the instruction detection area in the captured image matches the instruction request area represented by the marker in the captured image. In this example, the to-be-projected image of FIG. 12B and the captured image of FIG. 12C are illustrated in the same size. However, these images do not necessarily have the same size (or the same number of pixels) in practice because of factors, such as the angle of view or resolution of the projection optical system 181 and the angle of view or resolution of the image capturing unit 190.

Now, the pixel value of the instruction request area in the to-be-projected image output from the image processing unit 140 is focused on. The pixel value of this area is influenced by various transfer functions, such as influences of brightness of the light source 160, characteristics of the projection optical system 181, reflectance of the screen 105, exposure control of the image capturing unit 190, and natural light in the installed environment of the screen 105. Thus, the pixel value of the instruction request area in the to-be-projected image output from the image processing unit 140 differs from the pixel value of the instruction detection area in a captured image obtained by the image capturing unit 190 through image capturing.

Further, the size (or the number of pixels) of the instruction request area in the to-be-projected image and the size (or the number of pixels) of the instruction detection area in the captured image are not equal as described above.

Because of the conditions described above, the total sum of the pixel values of the instruction request area in the to-be-projected image output from the image processing unit 140 cannot be simply compared with the total sum of the pixel values of the instruction detection area in the captured image output from the image capturing unit 190. Thus, these transfer functions need to be cancelled out in one or more embodiments.

To cancel out the influences of these transfer functions, the control unit 110 determines a difference between the total sum of the pixel values of the instruction request area loaded from the image processing unit 140 and the total sum of the pixel values of the instruction detection area loaded from the image capturing unit 190 in the state in which the marker is displayed. A transfer function correction value determined in this way is stored in the RAM 111.

After these operations, the calibration of brightness of the instruction request area and the instruction detection area completes.

In this way, the initial setup completes.

Operation Flow of Projector

Figure 5:
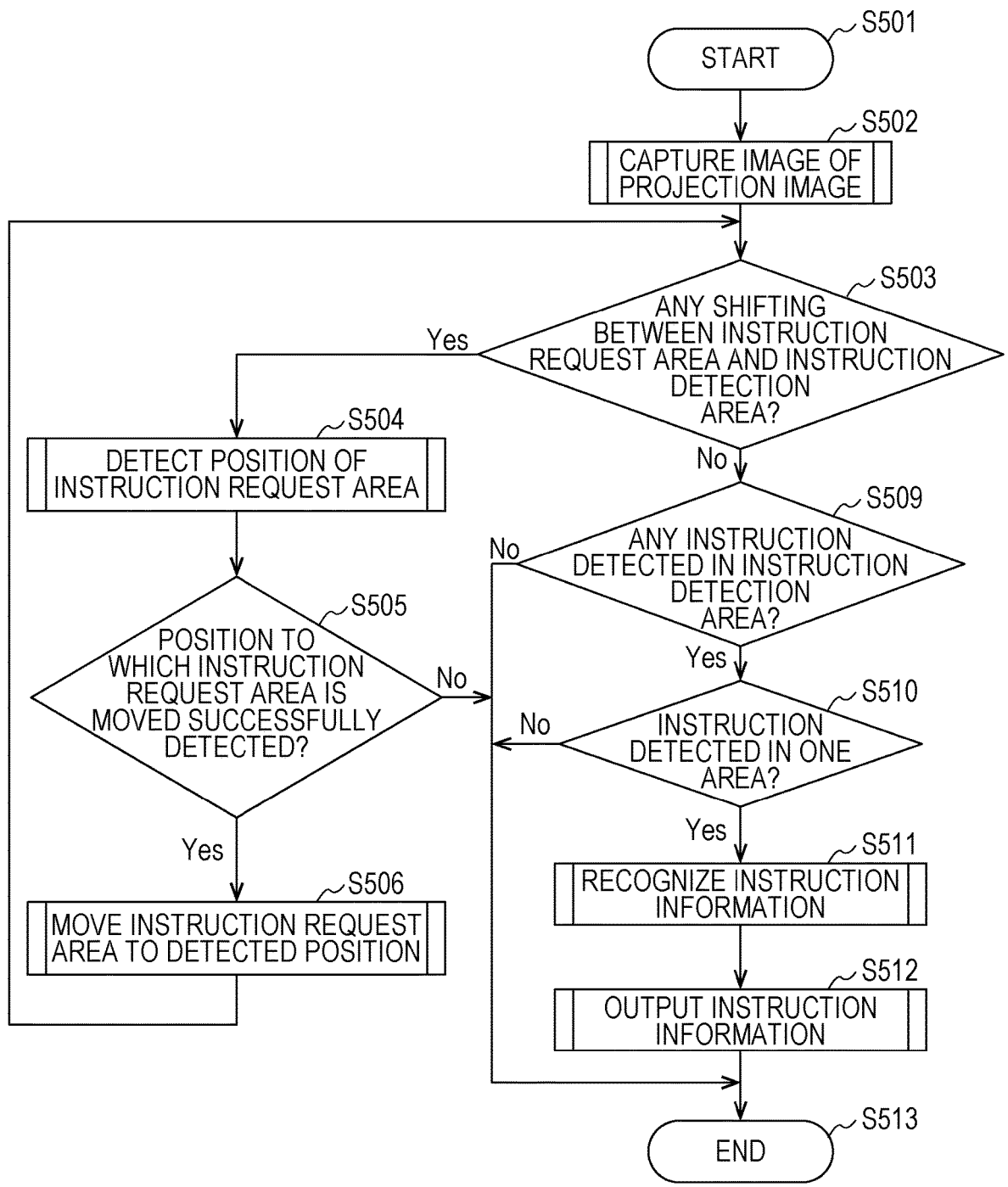
FIG. 5 is a flowchart of at least one embodiment of an operation flow, or a method for controlling, the projector.

After finishing the initial setup, the control unit 110 performs control in accordance with a flowchart of FIG. 5.

In S501, the control unit 110 starts control.

In S502, the control unit 110 causes the image capturing unit 190 to capture an image of a range including a projection image projected by the projection optical system 181 onto the screen 105. The captured image obtained by the image capturing unit 190 is input to the control unit 110 and the instruction recognition unit 192.

In S503, the control unit 110 determines whether the instruction request area and the instruction detection area are not shifted from each other. Although the projector 102 is adjusted and the instruction function is calibrated in the initial setup, this step is performed to determine whether the marker representing the instruction request area in the projection image included in the captured image is somehow shifted from the instruction detection area in the captured image.

This determination can be implemented by detecting whether the operator has adjusted the projection position, has adjusted the zoom ratio, or has performed trapezoidal distortion correction again using the shift function of the projection optical system 181 or the image processing unit 140 after the initial setup as illustrated in FIGS. 4A to 4D, for example. In addition, this determination can also be implemented by detecting a change in the projection condition, such as a change in the angle of elevation, in the projection direction, or in the angle of view, which is somehow caused in the projector 102 that is projecting the image.

That is, this determination is to detect shifting of the position of the marker representing the instruction request area in the captured image from the instruction detection area due to the some kind of reason.

If the instruction request area and the instruction detection area are shifted from each other because of the aforementioned reason, the instruction given by the operator is no longer correctly recognized as illustrated in FIGS. 4A to 4D. Thus, whether shifting is present is determined.

As described above, the control unit 110 can use various methods to determine shifting between the instruction detection area in the captured image and the marker representing the instruction request area in the projection image included in the captured image. These methods will be described one by one below.

As the method for detecting shifting between the instruction request area and the instruction detection area, there is a method for detecting a change in a projection condition by referring to an output value of a sensor included in each block of the projector 102. The control unit 110 reads in advance output values of these sensors immediately after the calibration described above and stores the output values in the RAM 111. A description will be given below using each of the sensors as an example.

As the sensor that serves as a detection unit that detects the shifting, the zoom encoder 181d included in the zoom optical system 181a of the projection optical system 181 can be used.

The zoom encoder 181d is an encoder that detects the position of a zoom optical system lens included in the projection optical system 181. The zoom optical system lens changes the zoom ratio using an actuator included in the projection optical system 181 that is controlled by the projection optical control unit 182. Alternatively, in the configuration not including the actuator, the operator may directly change the zoom ratio of the projection optical system 181 by operating an operation member (not illustrated), such as a lever coupled to the projection optical system 181. In this case, one or more embodiments of the present disclosure can also be carried out similarly. The zoom encoder output value changes in accordance with the zoom ratio of the projection optical system 181.

The control unit 110 is able to detect the zoom ratio of the projection optical system 181 by detecting a change in this zoom encoder output value. When this zoom ratio changes to be different from that obtained at the initial setup of the image display system 100, the control unit 110 can determine that the zoom ratio has changed. In this case, the control unit 110 can determine that the current instruction detection area is shifted from the instruction request area set in the initial setup as described in FIG. 4A.

As the sensor that serves as a detection unit that detects the shifting, the shift encoder 181*f* included in the shift optical system 181*c* of the projection optical system 181 can be used.

The shift encoder 181*f* is an encoder that detects the position of a shift optical system lens included in the projection optical system 181. The shift optical system lens changes shift amounts in the horizontal and vertical directions of the projection image using an actuator included in the projection optical system 181 that is controlled by the projection optical control unit 182. Alternatively, in the configuration not including the actuator, the operator may directly change the shift amounts of the projection optical system 181 by operating an operation member (not illustrated), such as a lever coupled to the projection optical system 181. In this case, one or more embodiments of the present disclosure can also be carried out similarly. The shift encoder output value for the horizontal direction and the shift encoder output value for the vertical direction change in accordance with the horizontal-direction and vertical-direction projection image shift amounts of the projection optical system 181.

The control unit 110 is able to detect a change in the shift amount of the projection optical system 181 by detecting changes in the horizontal-direction and vertical-direction shift encoder output values. When this shift amount changes to be different from the value obtained at the initial setup of the image display system 100, the control unit 110 can determine that the shift amount has changed. In this case, the control unit 110 can determine that the current instruction detection area is shifted from the instruction request area set in the initial setup as described in FIG. 4B or FIG. 4C.

That is, when the state of the projection optical system changes, the control unit 110 determines that the instruction detection area and the instruction request area are shifted from each other. Specifically, when a zoom amount of the zoom optical system 181*a* of the projection optical system 181 changes by a predetermined zoom amount or more, the control unit 110 determines that the instruction detection area and the instruction request area are shifted from each other. In addition, when a shift amount of the shift optical system 181*c* of the projection optical system 181 changes by a predetermined shift amount or more, the control unit 110 determines the instruction detection area and the instruction request area are shifted from each other. The zoom amount of the zoom optical system 181*a* is detected based on an output value of a position encoder configured to detect the position of the lens of the zoom optical system 181*a*. The shift amount of the shift optical system 181*c* is detected based on an output value of a position encoder configured to detect the position of the lens of the shift optical system 181*c*.

As the sensor that serves as a detection unit that detects the shifting, the inclination sensor unit 145 can be used. The occurrence of the shifting may be determined using this inclination sensor unit 145 as the sensor.

The inclination sensor unit 145 detects an inclination or orientation of the housing. The image processing unit 140 performs trapezoidal distortion correction by using a correction value based on the detected angle.

The control unit 110 is able to detect a change in a trapezoidal distortion correction amount by detecting a change in the output value of the inclination sensor unit 145. When this sensor output value changes to be different from the value obtained at the initial setup of the image display system 100, the state of the trapezoidal distortion on the projection screen changes. In this case, the control unit 110 can determine that the current instruction detection area is shifted from the instruction detection area set in the initial setup as described in FIG. 4D.

In another method for detecting shifting between the instruction request area and the instruction detection area, the shifting can also be detected by capturing an image of the projection image projected by the projector 102 and by measuring a change in the size thereof. This method is a method for comparing the size of the projection image obtained at the time of calibration with the size of the current projection image and determining that the instruction request area and the instruction detection area are shifted from each other if a change occurs.

The method for detecting a change in the size of the projection image will be described below using FIGS. 7A to 7D.

Figure 7A:
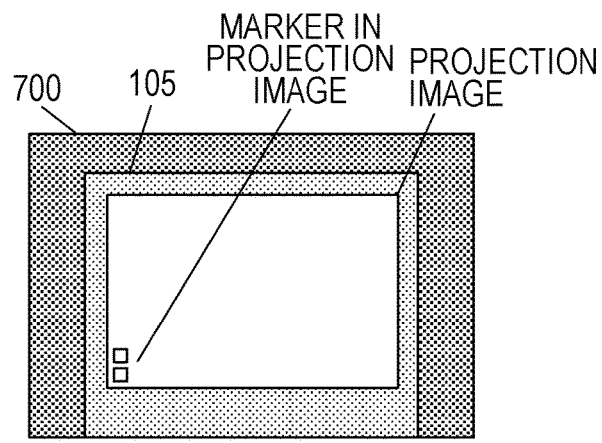
FIGS. 7A to 7D are diagrams for describing a method for detecting a size and a position of the projection image included in the captured image.
Figure 7B:
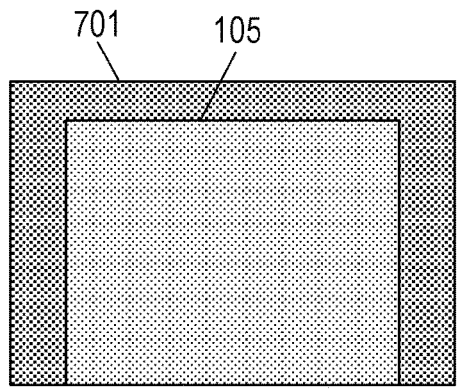

First, the control unit 110 causes the image capturing unit 190 to capture an image of the projection image. Specifically, the control unit 110 adjusts an image capturing timing in accordance with a synchronization signal of a video signal output from the image processing unit 140 and causes the image capturing unit 190 to capture an image at a timing at which an image is projected by the projection optical system 181. Consequently, for example, a captured image 700 illustrated in FIG. 7A is obtained. The captured image 700 includes images of the screen 105, the projection image, and markers representing the instruction request areas in the projection image. The control unit 110 stores the captured image 700 in the RAM 111. At another time point, the control unit 110 causes the image capturing unit 190 to capture an image at substantially the same angle of view at a timing at which no image is projected. Consequently, for example, a captured image 701 illustrated in FIG. 7B is obtained. The captured image 701 includes only an image of the screen 105. The control unit 110 stores the captured image 701 in the RAM 111. For example, if a timing at which an optical black image is displayed is provided during calibration as the timing at which no image is projected, the image may be captured at that timing. For example, if processing for outputting a frame of an optical black image is performed regularly (for example, every ⅟60 seconds for ⅟120 seconds) as the timing at which no image is projected, image capturing may be performed at the timing at which the frame of the optical black image is inserted.

Figure 7C:
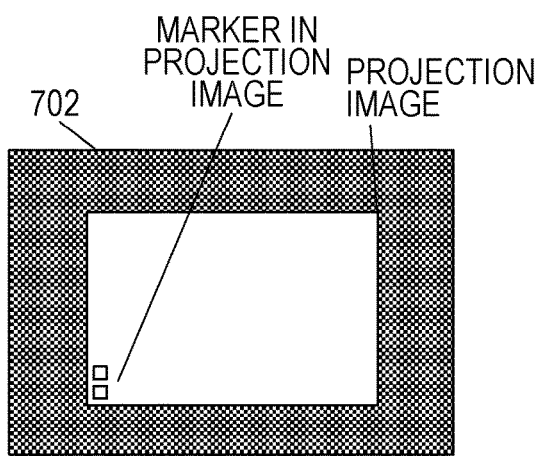

Then, the control unit 110 reads the captured image 700 and the captured image 701 stored in the RAM 111 and calculates a difference therebetween. Consequently, a differential image 702 illustrated in FIG. 7C is extracted. The projection image is extracted as the differential image 702. The control unit 110 detects coordinates of the edge portions of the projection image area in the horizontal and vertical directions in this differential image 702. Specifically, adjacent pixel values are compared for each of the horizontal and vertical directions, and coordinates with a large differential value are determined as the edge of the projection image area in the captured image.

Figure 7D:
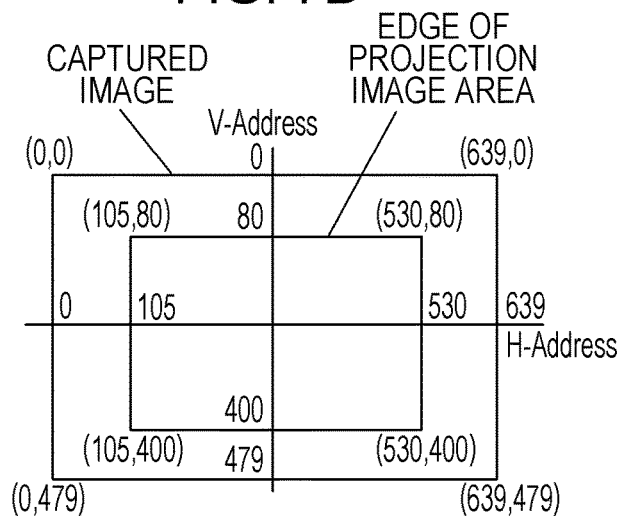

FIG. 7D illustrates the state in which coordinates of the edge of the projection image area in the captured image are calculated. In this example, the captured image has 640 pixels×480 pixels. Among these pixels, a quadrangle enclosed by four points having coordinates of (105, 80), (530, 80), (530, 400), and (105, 400) indicates the edge of the projection image area. The size of the projection image can be calculated from the coordinates of this edge.

The control unit 110 similarly detects the size of the projection image area at the time of the aforementioned calibration and stores the size in the RAM 111. The control unit 110 compares the size of the projection image area obtained by the image capturing unit 190 during projection with the size of the projection image area obtained at the time of the calibration and read from the RAM 111. If there is a difference in the size of the projection image area, the control unit 110 can determine that the instruction request area and the instruction detection area are shifted from each other. In this way, the control unit 110 can detect the cases illustrated in FIGS. 4A and 4D, for example.

Note that the size of the projection image area may be measured and stored in the RAM 111 regularly and the current size may be compared with the sizes determined in the past (stored in the RAM 111). Also in this case, the control unit 110 can similarly determine that the instruction request area and the instruction detection area are shifted from each other if there is a difference in the size of the projection image area.

Note that the positions of the projection image areas may be compared with each other instead of comparing the sizes of the projection image areas. If a difference is found between the positions of the projection image areas as a result of this comparison, the control unit 110 can determine that the instruction request area and the instruction detection area are shifted. In this way, the control unit 110 can detect the cases illustrated in FIGS. 4B, 4C, and 4D, for example.

Figure 8:
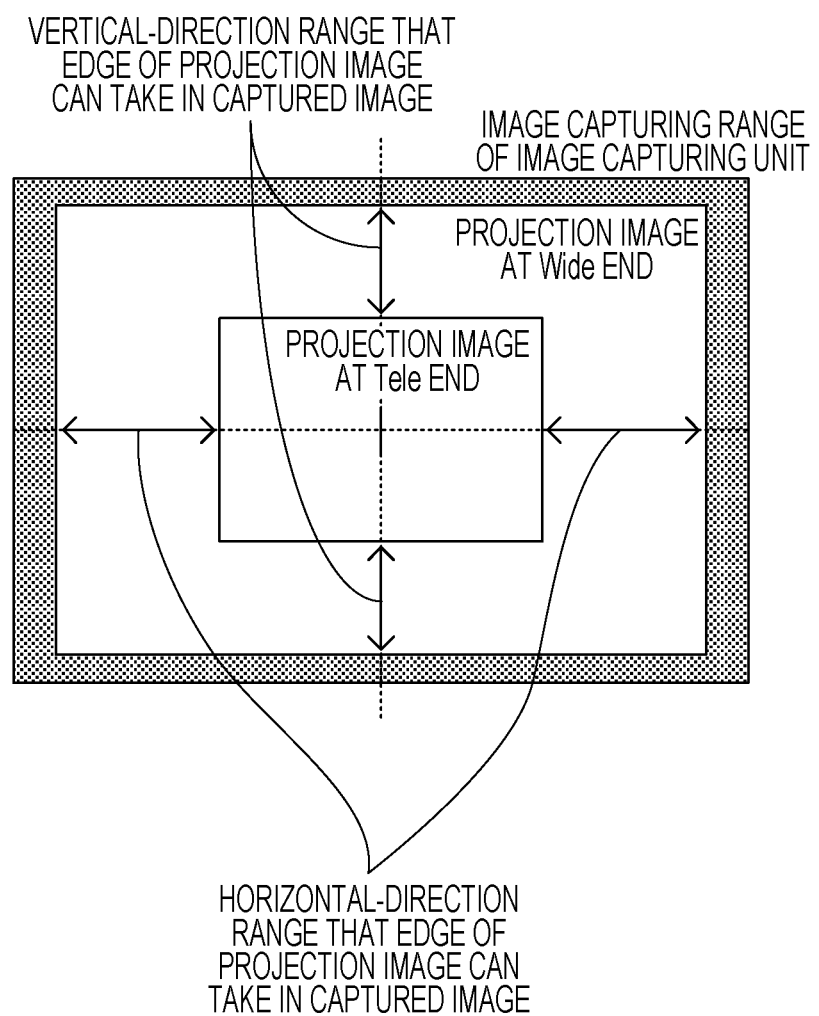
FIG. 8 is a diagram for describing the cases where the projection image is the largest and is the smallest in the captured image.

At that time, the detection of the edge of the projection image in the captured image obtained by the image capturing unit 190 may be performed within a range based on the specification of the projection optical system 181 instead of performing the detection in the entire area of the captured image. FIG. 8 is a diagram illustrating the case where the projection image is the largest (the zoom optical system 181*a* is set to the wide end) in the captured image obtained by the image capturing unit 190 and the case where the projection image is the smallest (the zoom optical system 181*a* is set to the tele end) in the captured image. Even when the zoom ratio is changed while the image is being projected by the projector 102, the size of the projection image in the captured image changes only in the range based on the specification of the zoom optical system 181*a* of the projection optical system 181. Thus, the entire range of the captured image need not be set as a target for detecting the edge of the projection image in the captured image to detect a change in the size of the projection image. That is, areas of the captured image indicated by arrows in FIG. 8 may be set as the target. This can reduce the time taken for detection of the edge of the projection image. The optical specification information about the tele end and the wide end may be stored in the ROM 112 or a storage unit not illustrated included in the projection optical system 181. The control unit 110 is capable of reading the optical specification information and determining the aforementioned range.

In another method for detecting shifting between the instruction request area and the instruction detection area, the shifting may be detected using a change in a parameter used by the image processing unit 140 in image processing.

As the parameter used to detect the shifting, an adjustment value used to correct the trapezoidal distortion by the image processing unit 140 can be used. For example, horizontal and vertical angle values can be used as the adjustment values of the trapezoidal distortion correction. The image processing unit 140 performs a projective transformation on the projection image based on these angle values, whereby the trapezoidal distortion of the projection image can be corrected based on a positional relationship between the housing of the projector 102 and the screen 105. The parameter of the trapezoidal distortion correction may be obtained from the operator via the operation unit 113. In addition, the adjustment values of the trapezoidal distortion correction may be obtained from an inclination of the projector 102 detected by the inclination sensor unit 145. The trapezoidal distortion correction parameter obtained at the time of completion of the calibration may be stored in the RAM 111. The control unit 110 can determine that the instruction request area and the instruction detection area are shifted from each other upon detecting a difference between the stored adjustment value and the current adjustment value of the trapezoidal distortion correction. Alternatively, the trapezoidal correction parameter may be obtained and stored in the RAM 111 regularly, and the occurrence of a change may be detected by comparing the parameter with the values obtained in the past. In this way, for example, the case illustrated in FIG. 4D is successfully detected.

Note that an adjustment value for correcting another geometric distortion as well as that for correcting the trapezoidal distortion may be used as the parameter used to detect the shifting. For example, a correction value for a pincushion distortion or a barrel distortion or a parameter for correcting a free-surface distortion caused when an image is projected onto a given curved surface may be used. As described above, any parameter for correcting a distortion that changes the position of the projection detection area when viewed from the image capturing unit 190 can be used in one or more embodiments of the present disclosure. In addition, in a method for obtaining such a parameter, the parameter may be automatically calculated from the output value of the image capturing unit or the sensor or may be input by the operator. As described above, any parameter obtaining method may be used.

As the parameter used to detect the shifting, an adjustment value used in the position adjustment performed by the image processing unit 140 or the optical-modulation-element driving unit 150 may be used.

Figure 13:
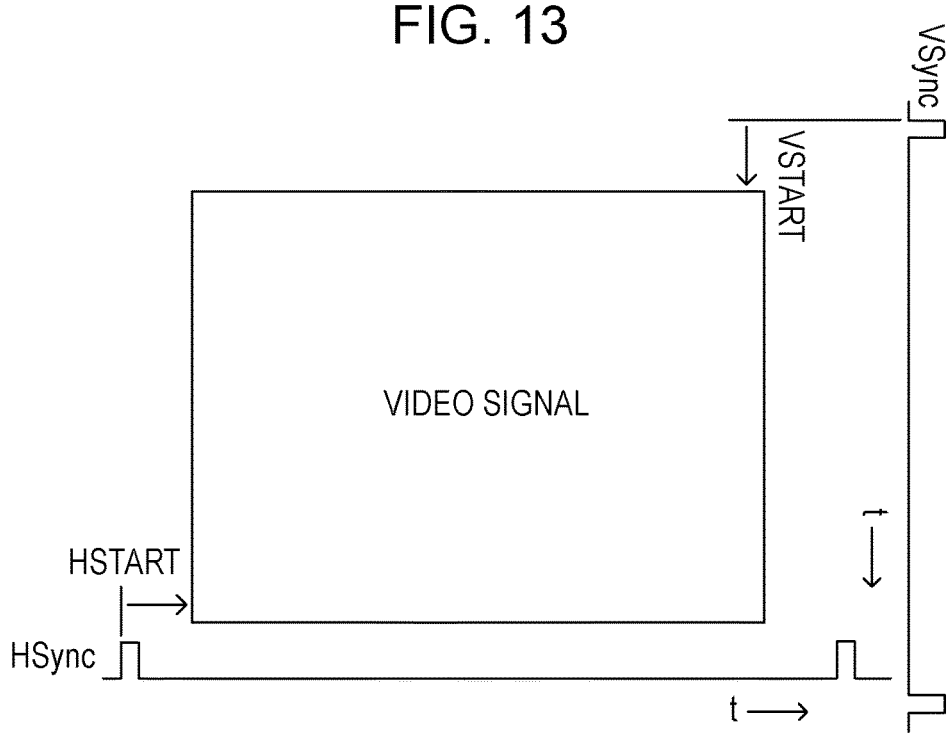
FIG. 13 is a diagram for describing a relationship between horizontal/vertical synchronization and a video signal.

The adjustment value used in the position adjustment will be described using FIG. 13. FIG. 13 illustrates one video frame processed by the image processing unit 140 or the optical-modulation-element driving unit 150. One video frame includes timing signals called a vertical synchronization signal (VSync) indicating switching of the frame and a horizontal synchronization signal (HSync) indicating switching of the line constituting the frame and the corresponding image data. The image processing is performed by the image processing unit 140 in synchronization with the horizontal synchronization signal and the vertical synchronization signal attached to the video signal input from the image input unit 120 or with the horizontal synchronization signal and the vertical synchronization signal uniquely generated inside the projector 102. The example illustrated in FIG. 13 indicates that the image processing unit 140 outputs a video signal from HSTART which is a point after a period from the leading end of the horizontal synchronization signal HSync. In addition, the example indicates that the video signal is output from VSTART which is a point after a period from the leading end of the vertical synchronization signal VSync. The control unit 110 is able to control the display position of the projection image as illustrated in FIG. 4B or FIG. 4C by controlling the values of HSTART and VSTART. The values of HSTART and VSTART can be used as the adjustment values used in the position adjustment. The control unit 110 stores the adjustment values used in the position adjustment in the RAM 111 at the time of completion of the calibration and can determine that the instruction request area and the instruction detection area are shifted from each other upon detecting a difference between the stored adjustment values and the current adjustment values used in the position adjustment. Alternatively, the control unit 110 may obtain the adjustment values used in the position adjustment and store the adjustment values in the RAM 111 regularly and may detect the occurrence of a change by comparing the obtained adjustment values with the values obtained in the past. In this way, the control unit 110 can detect the cases illustrated in FIGS. 4B and 4C, for example.

As the parameter used to detect the shifting, an adjustment value used in enlargement processing/reduction processing performed by the image processing unit 140 may be used. The adjustment value used in enlargement processing/reduction processing is, for example, an enlargement ratio or a reduction ratio for the input image. The enlargement/reduction processing performed on the image by the image processing unit 140 may be realized by subsampled writing/reading or multiple writing/reading in a frame memory not illustrated, for example. The control unit 110 stores the adjustment value used in the enlargement/reduction processing in the RAM 111 at the time of completion of the calibration and can determine that the instruction request area and the instruction detection area are shifted from each other upon detecting a difference between the stored parameter and the current parameter of enlargement/reduction processing. Alternatively, the control unit 110 may obtain the adjustment value used in enlargement/reduction processing and store the adjustment value in the RAM 111 regularly and may detect the occurrence of a change by comparing the obtained value with the value obtained in the past. In this way, the control unit 110 can detect the case illustrated in FIG. 4A, for example.

In addition, the control unit 110 may perform panning without changing the horizontal inclination of the housing and may detect that shifting has occurred between the instruction request area and the instruction detection area upon detecting a change in the projection direction. For example, the control unit 110 may make this determination based on the output value of a gyro sensor or a Global Positioning System (GPS) sensor.

If the control unit 110 detects the shifting between the instruction request area and the instruction detection area by using at least one of the methods described above in S503, the process proceeds to S504. If the shifting is not detected, the process proceeds to S509.

In S504, the control unit 110 detects the position to which the instruction request area, which has been shifted because of some kind of reason, is to be moved in the captured image. Various methods may be used to find the position to which the shifted instruction request area is to be moved. Examples of these methods will be described.

As a method for detecting the destination to which the instruction request area is to be moved in the captured image, there is a method using an image captured by the image capturing unit 190. Specifically, this method is a method for searching for the position of the marker representing the instruction request area from the captured image. A template matching technique may be used in this search.

The control unit 110 sets a marker area in a to-be-projected image output from the image processing unit 140 as a template image and sets a captured image obtained by the image capturing unit 190 as a search area, and searches for the position of the marker, which is the instruction request area in the captured image, by template matching. Template matching is a kind of image processing and is a technique for detecting a specific pattern from an image being observed.

Specifically, the control unit 110 sets a pattern image representing the instruction request areas as the template image, scans the captured image using the template image, calculates a degree of similarity at each position of the captured image, and detects the position with the highest degree of similarity.

Figure 10A:
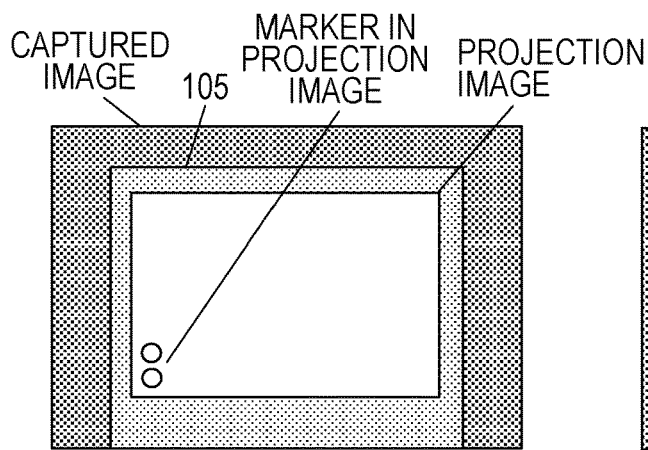
FIGS. 10A to 10D are diagrams for describing template matching.
Figure 10B:
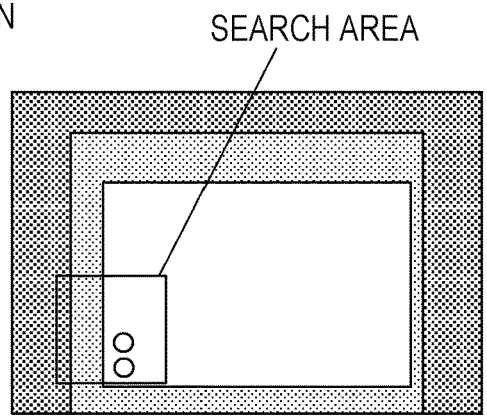
Figure 10C:
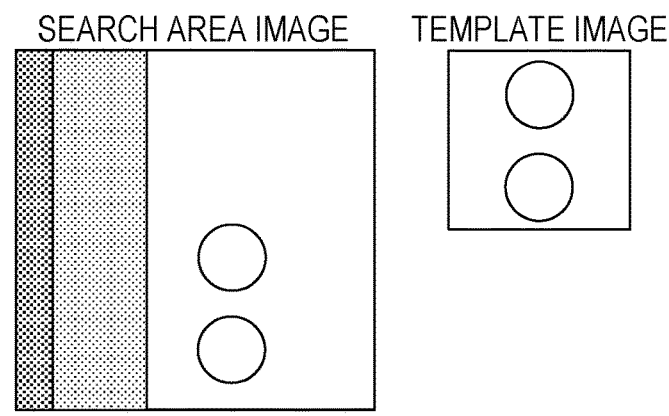
Figure 10D:
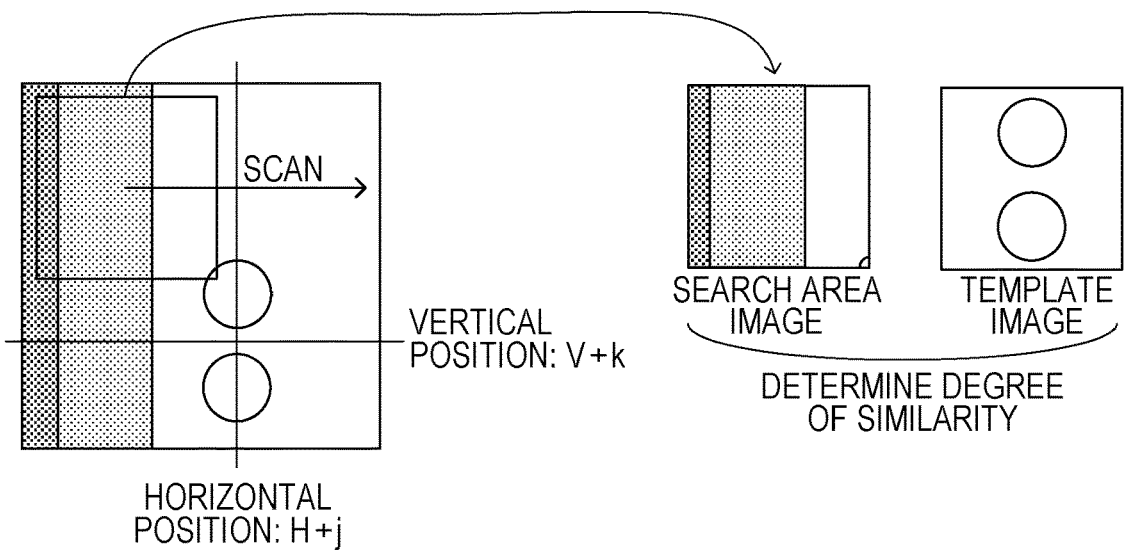

FIGS. 10A to 10D are diagrams describing template matching. FIG. 10A illustrates a captured image obtained when the initial setup of the image display system 100 is finished. FIG. 10B illustrates a captured image obtained when the projection position of the projector 102 is somehow shifted in the lower right direction from the position obtained when the initial setup is finished in FIG. 10A and illustrates the search area for template matching. The search area is an area that is scanned using the template image in the captured image. FIG. 10C illustrates a search area image obtained by extracting the search area from the captured image illustrated in FIG. 10B and the template image including the marker areas representing the instruction request areas and serving as the template. FIG. 10D is a diagram illustrating matching processing performed on the search area image and the template image.

The control unit 110 extracts the instruction request areas as the template image from the image signal output by the image processing unit 140 and stores the template image in the RAM 111. The control unit 110 also stores, in the RAM 111, as the search area image, an image of an area that is wider than the template image and is centered at the instruction detection areas set at the initial setup from the image captured by the image capturing unit 190. Note that the size of the search area image may be predetermined and stored in the ROM 112. The control unit 110 also extracts an image having a size identical to the size of the template image from the search area image stored in the RAM 111.

Then, the control unit 110 determines the degree of similarity between the template image and the extracted search area image that have the identical size. Specifically, the control unit 110 may determine differences between pixels located at the same positions and may use the sum of the differences at the pixels in the areas as a determined value of the degree of similarity. The control unit 110 stores the obtained determined value of the degree of similarity in the RAM 111.

Then, the control unit 110 extracts, from the search area image stored in the RAM 111, an image having a size identical to the size of the template image by shifting the position by a given number of pixels (for example, one pixel) from the foregoing position. The control unit 110 determines the degree of similarity between the template image that has been initially sent and the newly extracted search area image and stores the obtained determined value of the degree of similarity in the RAM 111. As described above, the control unit 110 determines the degree of similarity by pattern matching while shifting (scanning) the search area image by a given number of pixels and stores the determined value of the degree of similarity in the RAM 111 each time.

After completing the determination of the degree of similarity with the template image at every position in the search area image, the control unit 110 can determine that the coordinate values corresponding to the largest determined value of the degree of similarity stored in the RAM 111 represent the coordinates to which the instruction request area is to be moved in the search area.

If the obtained largest determined value of the degree of similarity falls below a predetermined value, the control unit 110 determines that the destination to which the instruction request area is to be moved is not found. Another method may be used as the method for determining that the destination to which the instruction request area is to be moved is not found. For example, the control unit 110 may detect a plurality of determined values of the degree of similarity exceeding a predetermined value and may determine that the destination to which the instruction request area is to be moved is not found if the positions indicated by the coordinate values are distributed in the captured image.

As another method for detecting the destination to which the instruction request area is to be moved in the captured image, a method for calculating the destination from an output value of the zoom encoder 181d of the projection optical system 181 may be used.

Figure 14:
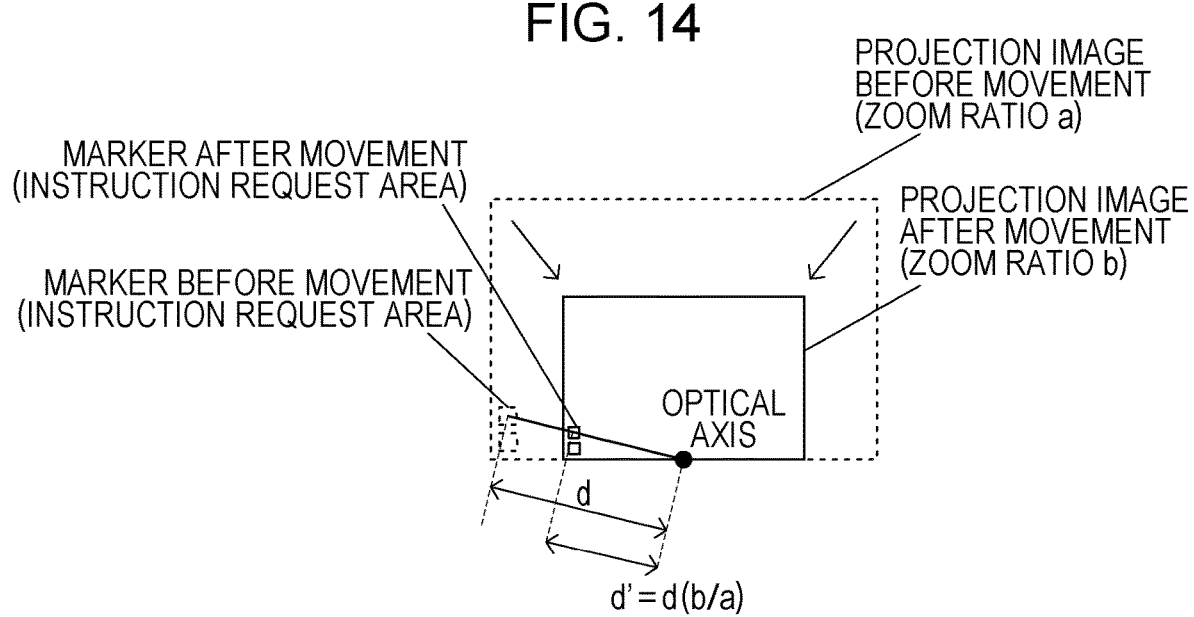
FIG. 14 is a diagram for describing zooming and a movement of the instruction request area.

An example of how the projection image is shifted will be described using FIG. 14. The control unit 110 stores the output value of the zoom encoder 181d in the RAM 111 at the time of completion of the calibration and reads the stored output value to determine the zoom ratio a at the time of completion of the calibration (before the movement). The example in FIG. 14 illustrates the state of the projection image before the movement by using a dash-line quadrangle. The control unit 110 also reads the zoom encoder value output by the zoom encoder 181d via the projection optical control unit 182 and calculates the zoom ratio b of the zoom optical system 181a of the projection optical system 181. The example in FIG. 14 illustrates the state of the projection image after the movement by using a solid-line quadrangle. It is assumed herein that the optical axis of the zoom optical system 181a, that is, the center of zooming, is at the center of the lower side of the projection image. Then, the marker (instruction request area) after the movement is present on a line segment between the marker (instruction request area) before the movement and the optical axis. In particular, when d denotes the distance between the marker before the movement and the optical axis, the distance between the marker after the movement and the optical axis is determined such that d'=d(b/a). In this way, the position of the instruction request area after the movement is successfully determined.

As another method for detecting the destination to which the instruction request area is to be moved in the captured image, a method for calculating the destination from a value of the shift encoder 181f of the projection optical system 181 may be used.

The control unit 110 reads the shift encoder values output by the shift encoder 181f via the projection optical control unit 182. The control unit 110 can calculate the projection position of the projection optical system 181 based on these values. Specifically, when the shift encoder values change, the control unit 110 converts amounts of movement in the horizontal and vertical directions based on the shift encoder values into amounts of movement in unit of pixels in the captured image. Since these amounts of movement are equivalent to amounts of movement of the instruction request area, the control unit 110 can calculate the destination to which the instruction request area is to be moved.

As another method for detecting the destination to which the instruction request area is to be moved in the captured image, there is a method for projecting a test pattern and detecting the destination from the angle of view and the position of the projection image detected from an image captured by the image capturing unit 190.

In this method, the operation described in the calibration of the instruction function in the use environment is performed again. In this way, the position to which the instruction request area is to be moved is detected.

Note that the present invention is not limited only to the methods described above, and two or more of the above-described methods may be used in combination.

Note that the present invention is not limited only to the methods described above, and any method that enables the position to which the instruction request area is to be moved to be calculated may be used.

In S505, the control unit 110 determines whether the position to which the instruction request area is to be moved is successfully detected in S504. If the destination to which the instruction request area is to be moved is successfully detected, the process proceeds to S506. If the destination to which the instruction request area is to be moved is not detected, the process proceeds to S513. The state in which the destination to which the instruction request area is to be moved is not detected is caused by a situation in which an obstacle or the like appears in front of the image capturing unit 190 so as to block the way, for example. In such a case, the process proceeds to S513 and the flow is aborted or is started over again.

In S506, the control unit 110 changes the position of the instruction detection area in the captured image to the position of the movement destination of the instruction request area detected in S504 in the captured image.

Figure 15A:
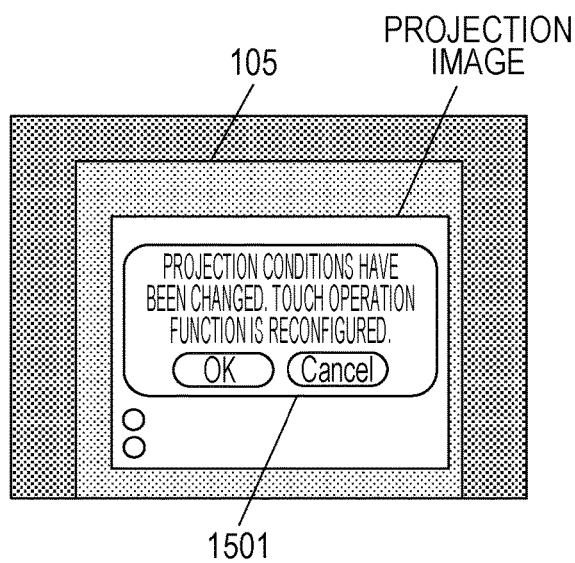
FIGS. 15A to 15D are diagrams for describing a notification image.

Note that when the instruction detection area is aligned to the movement position of the instruction request area, the operator may be notified in advance that the instruction detection area is to be moved. FIG. 15A illustrates an example in which the control unit 110 instructs the OSD unit 141 to superimpose a notification image 1501 on the projection image. The control unit 110 causes superimposition of the notification image 1501 to end after a predetermined period (after 5 seconds, for example). Note that the operator may be allowed to select whether to accept (OK) or reject (Cancel) the movement of the instruction detection area by projecting an image (option image). If the operator rejects the movement, the control unit 110 may skip the movement processing and the process may proceed to S503 or S513.

Figure 15B:
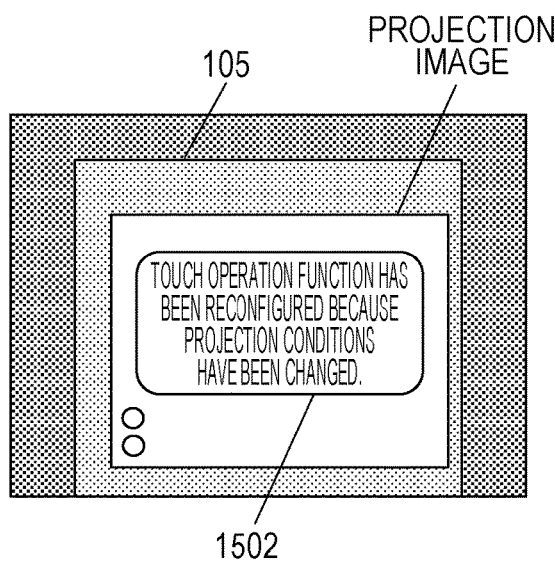

Note that the operator may be notified of the movement after the instruction detection area has been moved. FIG. 15B illustrates an example in which the control unit 110 instructs the OSD unit 141 to superimpose a notification image 1502 on the projection image. The control unit 110 causes superimposition of the notification image 1502 to end after a predetermined period (after 5 seconds, for example).

Note that S506 may be modified, and a function for detecting an instruction may be stopped instead of moving the position of the instruction detection area. Specifically, the control unit 110 may send a command to stop the operation to the instruction recognition unit 192 and may end this flow. At that time, the control unit 110 may superimpose a notification image 1504 illustrated in FIG. 15D on the projection image. The control unit 110 causes superimposition of the notification image 1504 to end after a predetermined period (after 5 seconds, for example). Since such a notification allows the operator to explicitly restart the instruction function or the projector 102, a situation in which it becomes difficult to input an instruction is successfully avoided.

If the control unit 110 determines that the amount of movement of the coordinates of the instruction request area detected from the captured image in S504 is sufficiently small so as not to hinder an operation performed by the operator, the instruction detection area need not be moved. This determination may be made as follows. For example, a threshold for the amount of movement may be stored in the ROM 112 in advance, and the control unit 110 may read the threshold and determine whether the amount of movement detected in S504 falls below the threshold. Alternatively, the operator may input the threshold via the operation unit 113.

Note that if the control unit 110 determines that the amount of movement of the coordinates of the instruction request area detected from the zoom encoder value and the shift encoder value in S504 is sufficiently small so as not to hinder an operation performed by the operator, the instruction detection area need not be moved. This determination may be made as follows. For example, a threshold for the amount of movement may be stored in the ROM 112 in advance, and the control unit 110 may read the threshold and determine whether the amount of movement detected in S504 falls below the threshold. Alternatively, the operator may input the threshold via the operation unit 113.

The process then returns to S503.

The flow starting from S509 will be described. If the instruction request area and the instruction detection area are not shifted from each other in S503, the process proceeds to S509. The operator gives an instruction by placing their hand over the marker representing the instruction request area on the projection image projected onto the screen 105. In response to such an operation, the control unit 110 determines whether an instruction is detected in the instruction detection area in the captured image in S509. Since there is a plurality of methods for detecting this instruction, each of the methods will be described.

A first method for detecting the operator's placing of their hand is a method for comparing data of a to-be-projected image with data of a captured image. Specifically, the control unit 110 instructs the instruction recognition unit 192 to compare the instruction request area of the to-be-projected image with an image of the instruction request area in the captured image.

Upon receipt of the instruction, the instruction recognition unit 192 compares the total sum of values of all the pixels in the instruction request area of the to-be-projected image with the total sum of values of all pixels in the instruction detection area of the captured image, for example. As described in the section regarding calibration, the pixel values in the captured image are influenced by transfer functions based on the light source 160, the projection optical system 181, reflectance of the screen 105, exposure control of the image capturing unit 190, and brightness of the installed environment of the screen 105. For this reason, the transfer function correction value that is obtained and stored in the RAM 111 at the time of calibration is used.

Specifically, the instruction recognition unit 192 calculates an instruction recognition value by using the following equation.

Instruction Recognition Value=(Total Sum of Values of Pixels in Instruction Request Area)−(Total Sum of Values of Pixels in Instruction Detection Area)+(Transfer Function Correction Value Obtained at Calibration)  (Equation 1)

When the operator does not place their hand, since the marker of the instruction request area in the to-be-projected image appears at the instruction detection area of the captured image as it is (while being influenced by the transfer functions), the instruction recognition value is substantially equal to 0. However, when the operator's hand blocks the marker on the projection surface of the screen 105 as a result of placing of the hand, the instruction recognition value becomes larger than 0 because the reflectance of the operator's hand is generally lower than that of the screen 105 and the value of the second term of Equation 1 decreases. In addition, when a shadow is casted over an area corresponding to the instruction detection area on the screen 105 as a result of placing of the hand, the value of the second term of Equation 1 decreases and consequently the instruction recognition value becomes larger than 0 likewise. In this way, the instruction recognition unit 192 can recognize the operator's placing of the hand, that is, an instruction.

Note that in one or more embodiments of the present disclosure, the calculation method of the instruction recognition value is not limited to the difference-based calculation method, and another calculation method may be used. For example, one of the instruction request area and the instruction detection area is enlarged or reduced so make the number of pixels in the instruction request area be equal to the number of pixels in the instruction detection area, a correction for the transfer functions is performed, and then differences between the corresponding pixels are determined. The total sum of squares of these differences may be used as the instruction recognition value. Even in this case, since a difference is similarly caused in the values depending on whether the hand is placed over, placing of the hand is successfully recognized.

A second method for detecting the operator's placing of the hand is a method for comparing data of captured images obtained in the past with data of a current captured image. For example, the control unit 110 instructs in advance the image capturing unit 190 to regularly capture an image of the screen 105 independently from the flow of FIG. 5. The captured images are stored in the RAM 111. In S509, the control unit 110 instructs the instruction recognition unit 192 to compare the captured images obtained in the past with the current (latest) captured image.

Figure 9:
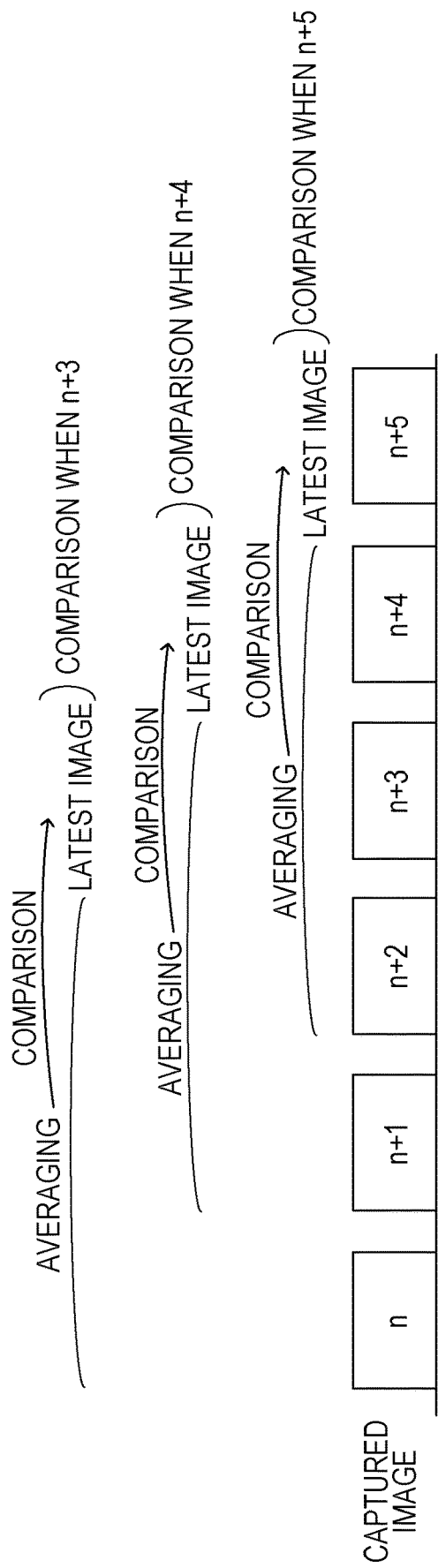
FIG. 9 is a diagram for describing comparison of the current captured image and a moving average of three captured images obtained in the past.

Upon receipt of the instruction, the instruction recognition unit 192 determines a moving average of the total sums of values of the pixels in the instruction detection area in some captured images obtained in the past. The instruction recognition unit 192 also determines the total sum of values of pixels in the instruction detection area in the current captured image. The instruction recognition unit 192 compares these values with each other. If the difference is less than or equal to a predetermined value, the instruction recognition unit 192 can determine that the hand is not placed; otherwise, the instruction recognition unit 192 can determine the hand is placed. FIG. 9 is a diagram illustrating comparison of the moving average of three captured images obtained in the past with the current captured image.

Immediately after an (n+3)-th captured image is obtained, an average in the instruction detection area of n-th, (n+1)-th, and (n+2)-th captured images is calculated. The average of these three images obtained in the past is compared with the pixel value in the instruction detection area of the (n+3)-th captured image.

Immediately after an (n+4)-th captured image is obtained, an average is calculated for the (n+1)-th, (n+2)-th, and (n+3)-th captured images. The pixel value in the instruction detection area of these three images obtained in the past is compared with the pixel value in the instruction detection area of the (n+4)-th captured image.

Immediately after an (n+5)-th captured image is obtained, an average is calculated for the (n+2)-th, (n+3)-th, and (n+4)-th captured images. The pixel value in the instruction detection area of these three images obtained in the past is compared with the pixel value in the instruction detection area in the (n+5)-th captured image.

Note that pixel value obtained in the past, instead of the moving average, may be compared with the current pixel value.

Although the method for comparing the total sums of values of pixels in the instruction detection area of the captured images has been described, the present invention is not limited to this method, and another method may be used. For example, a method for comparing pixels at the same coordinates and determining the total sum of squares of differences therebetween may be used. It is successfully determined likewise that the hand is not placed if the total sum is less than or equal to a predetermined value and that the hand is placed otherwise.

As a result of detecting placing of the hand by comparing images obtained in the past and the latest image in this way, the following secondary advantageous effect is obtained. Specifically, there is an influence of a change that occurs for a relatively long period, such as a change caused by on/off of lighting or a change in natural light from a window, in the use environment of the image display system 100. Only a change that occurs in a relatively short period, such as an instruction given through the operator's placing of their hand, can be detected.

If an instruction given by the operator is detected in this way, the process proceeds to S510. If no instruction is detected, the process proceeds to S513.

In S510, the control unit 110 determines whether the number of instruction detection areas for which the instruction recognition unit 192 has detected an instruction is one or plural. The operator gives a single instruction by placing their hand. Thus, when the instruction is detected in a plurality of instruction detection areas, a cause such as a person crossing in front of the projection surface of the screen 105, instead of the operator's placing of their hand, is likely. Thus, when an instruction is detected in a plurality of instruction detection areas, such an instruction is ignored.

If an instruction is detected only in a single instruction detection area, the process proceeds to S511. If an instruction is detected in a plurality of instruction detection areas, the process proceeds to S513.

In S511, the control unit 110 identifies the instruction detection area in which the instruction recognition unit 192 has recognized the instruction and recognizes a key operation command associated with the instruction detection area. This association is made by the operator when the instruction function is set during the initial setup described above. Alternatively, this association information may be stored in advance in the RAM 111 or the ROM 112.

The process then proceeds to S512.

In S512, the control unit 110 sends the key operation command recognized in S511 from the communication unit 114. In this embodiment, the communication unit 114 is a USB port, and the key operation command is sent to the computer 101 via the USB cable 104. The computer 101 performs an operation on application software or the like in accordance with the received key operation command. For example, the operation may be a page-down or page-up operation in presentation software.

The process then proceeds to S513.

In S513, the process ends. Note that the control may be repeated from S501 unless an abort instruction is given by the operator.

As described above, if the control unit 110 determines that the instruction request area and the instruction detection area are shifted from each other in S503 of the flow illustrated in FIG. 5, the control unit 110 stops a series of functions of recognizing an instruction given from the user and outputting information (command) corresponding to the instruction.

As described above, the projector 102 includes a projection unit that includes the projection optical system 181 and is configured to project a projection image including a display item. The projector 102 includes a sensor configured to sense an instruction detection area corresponding to the display item on a projection surface, the sensor including the image capturing unit 190 and the instruction recognition unit 192. The projector 102 includes the control unit 110 configured to perform processing relating to the projection image in response to the sensor detecting a predetermined instruction in the instruction detection area. The control unit 110 stops sensing performed by the sensor in a case where a state of the projection optical system 181 of the projection unit changes while the projection image including the display item is being projected.

Herein, the processing relating to the projection image is, for example, processing of changing image data used by the projection unit to project the projection image.

Further, the control unit 110 may cause the projection unit to project a notification image indicating that the sensing is stopped in the case where the state of the projection optical system 181 of the projection unit changes while the projection image including the display item is being projected.

In addition, the control unit 110 may enable the instruction function that uses an output of the sensor in the case where the display item is projected by the projection unit and may disable the instruction function in the case where the state of the projection optical system 181 changes while the display item is being projected by the projection unit. Here, the instruction function is a function of performing control relating to the projection image in the case where the predetermined instruction is detected in the instruction detection area, for example. For example, the instruction function is a function of outputting an instruction for changing (switching) image data to an external apparatus that outputs image data used to project the projection image, in the case where the predetermined instruction is detected in the instruction detection area.

Further, the projector 102 can include the communication unit 114 configured to communicate with an external apparatus (image output apparatus) that outputs image data and to obtain image data from the external apparatus. In this case, the control unit 110 controls the communication unit 114 such that a predetermined signal is output to the external apparatus in response to the sensor detecting the predetermined instruction in the instruction detection area. Here, the predetermined signal may be a signal for instructing the external apparatus to change (switch) the image data output by the external apparatus, for example. Further, the control unit 110 performs processing of changing the position of the instruction detection area in the case where the projection condition of the projection unit changes while the projection image including the display item is being projected. The change in the projection condition includes a change in the state of the projection optical system 181 and a change in a parameter used in image processing of image data. The image processing includes, for example, at least any one of trapezoidal distortion correction processing, geometric distortion correction processing, enlargement processing, reduction processing, and adjustment of the position of the projection image. The parameter is an adjustment value used in such processing.

Further, the control unit 110 may control the projection unit to project an option image that allows the user to select whether to change the position of the instruction detection area in the case where the projection condition of the projection unit changes while the projection image including the display item is being projected. In this case, when the user selects to change the position of the instruction detection area, the control unit 110 may perform the processing of changing the position of the instruction detection area.

The projection optical system 181 may include the zoom optical system 181a configured to optically control a size of a projection image on a projection surface. The control unit 110 determines that the state of the optical system has changed or the projection condition has changed in the case where a zoom ratio of the zoom optical system 181a changes by a predetermined amount or more while the projection image including a predetermined display item is being projected. The projection optical system 181 also includes a position encoder used to detect the position of a lens of the zoom optical system 181a. The control unit 110 can detect a change in the zoom ratio of the zoom optical system 181a, based on an output value of the position encoder.

The projection optical system 181 may include the shift optical system 181c configured to optically control a position of a projection image on a projection surface. The control unit 110 determines that the state of the optical system has changed or the projection condition has changed in the case where a shift amount of the shift optical system 181c changes by a predetermined amount or more while the projection image including a predetermined display item is being projected. The projection optical system 181 also includes a position encoder used to detect the position of a lens of the shift optical system 181c. The control unit 110 can detect a change in the shift amount of the shift optical system 181c, based on an output value of the position encoder.

The image capturing unit 190 captures an image of a range including the projection image projected onto the projection surface to obtain a captured image. The instruction recognition unit 192 detects a predetermined instruction based on the captured image. The instruction recognition unit 192 also determines that the predetermined instruction is given in the case where a difference between an area corresponding to the display item in the projection image and an area corresponding to the display item in the captured image is greater than a predetermined difference.

In this way, an advantageous effect that the occurrence of erroneous detection of an operator's instruction without the operator understanding the cause can be reduced even if a setting of the projector or a projection condition of the projection unit changes after the setup of the instruction function for the operator's placing of the hand and consequently the instruction request area and the instruction detection area are shifted from each other is obtained.

Second Embodiment

The present invention is applicable to a configuration obtained by modifying the first embodiment. A difference from the first embodiment will be described.

The operation flow described in the first embodiment using FIG. 5 is modified as illustrated in FIG. 11. Modified parts will be mainly described below by omitting a description of the common parts.

S1101 to S1103 are the same as S501 to S503 in the first embodiment.

Figure 15C:
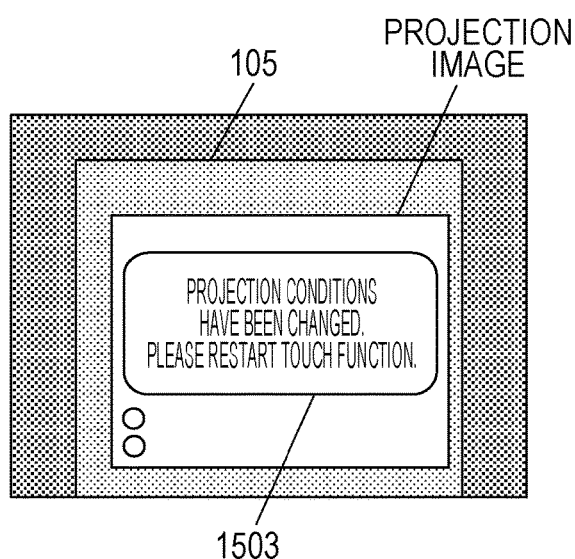
Figure 15D:
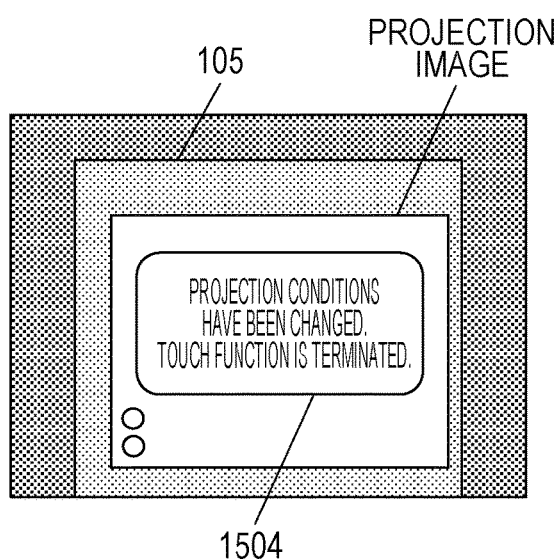

In S1104, the control unit 110 issues, to the operator, a notification corresponding to the shifting between the instruction request area and the instruction detection area detected in S1103. Specifically, the control unit 110 notifies the operator that it is difficult to detect an instruction. FIG. 15C illustrates an example in which the control unit 110 instructs the OSD unit 141 to superimpose a notification image 1503 on the projection image. The control unit 110 causes superimposition of the notification image 1503 to end after a predetermined period (after 5 seconds, for example). With such a notification, a situation can be prevented in which the operator does not understand the cause when a phenomenon in which an instruction is no longer input or the accuracy of the input decreases occurs when viewed from the operator.

Note that the function for detecting the instruction may be stopped. Specifically, the control unit 110 may send a command to stop the operation to the instruction recognition unit 192 and may end this flow. In this case, the control unit 110 may cause the notification image 1504 illustrated in FIG. 15D to be superimposed on the projection image. The control unit 110 causes superimposition of the notification image 1504 to end after a predetermined period (after 5 seconds, for example). Since such a notification allows the operator to explicitly restart the instruction function or the projector 102, a situation in which it is difficult to input an instruction can be avoided.

Note that the present invention is not limited to these notification examples. Different notification methods may be used. For example, a different image may be presented or the notification image need not be superimposed on an image signal input from the outside. Alternatively, the control unit 110 may emit a warning sound for the operator by using a sounding element 191 illustrated in the configuration of the projector 102 in FIG. 2A.

The process then proceeds to S1109.

Since S1105 to S1109 are the same as S509 to S513 of the first embodiment, the description is omitted.

In this way, an advantageous effect that the occurrence of erroneous detection of an operator's instruction without the operator understanding the cause can be reduced even if a setting of the projector or a projection condition of the projection unit changes after the setup of a function relating to an instruction given through the operator's placing of the hand and consequently the instruction request area and the instruction detection area are shifted from each other is obtained.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

As the storage medium used to provide the program code, for example, a flexible disk, a hard disk, an optical disc such as a Compact Disc-Read Only Memory (CD-ROM) or a CD-recordable (CD-R), a magneto-optical disk, a magnetic tape, a nonvolatile memory card, a ROM, or the like can be used.

In addition, needless to say, at least one embodiment of the present disclosure includes the case where the operating system (OS) (basic system or operating system) operating on the apparatus performs part or entirety of the processing based on instructions of the aforementioned program code and the above-described functions of the embodiments are implemented by such processing.

Further, needless to say, at least one embodiment of the present disclosure includes the case where the program code read from the storage medium is written to a memory included in a function expansion board inserted into the apparatus or a function expansion unit connected to a computer and the above-described functions of the embodiments are implemented. In such a case, a CPU or the like included in the function expansion board or the function expansion unit performs part or entirety of the actual processing based on instructions of the program code.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-110277, filed Jun. 2, 2017, and U.S. Patent Application No. 62/519,726, filed Jun. 14, 2017, which applications are hereby incorporated by reference herein in their entireties.

What is claimed is:

1. A projection apparatus comprising:
a projection unit including an optical system, the projection unit being configured to project a projection image including a predetermined display item onto a projection surface, and the optical system including a zoom optical system configured to optically control a size of the projection image on the projection surface;
a detection unit configured to detect a zoom ratio of the zoom optical system;
a sensor configured to sense a predetermined area corresponding to the predetermined display item on the projection surface; and
a control unit configured to: (i) perform processing of changing image data used by the projection unit to project the projection image in response to the sensor detecting a predetermined instruction in the predetermined area, and (ii) stop sensing performed by the sensor in response to a change of the zoom ratio of the zoom optical system being greater than or equal to a predetermined amount while the projection image including the predetermined display item is being projected.

2. The projection apparatus according to claim 1, wherein the control unit is further configured to cause the projection unit to project a notification image indicating that the sensing is stopped in response to the change of the zoom ratio of the zoom optical system being greater than or equal to a predetermined amount while the projection image including the predetermined display item is being projected.

3. The projection apparatus according to claim 1, further comprising:
a first position encoder configured to detect a position of the zoom optical system,
wherein the detection unit is configured to detect the zoom ratio of the zoom optical system, based on an output value of the first position encoder.

4. The projection apparatus according to claim 1, wherein the optical system further includes a shift optical system configured to optically control a position of the projection image on the projection surface,
the detection unit is configured to detect a shift amount of the shift optical system, and
the control unit stops the sensing performed by the sensor in a response to a change of a shift amount of the shift optical system being greater than or equal to a predetermined amount while the projection image including the predetermined display item is being projected.

5. The projection apparatus according to claim 4, further comprising:
a second position encoder configured to detect a position of the shift optical system, wherein
the detection unit is configured to detect a change in the shift amount of the shift optical system, based on an output value of the second position encoder.

6. The projection apparatus according to claim 1, further comprising:
an image processing unit configured to output, to the projection unit, image data obtained by performing, based on a parameter, image processing on input image data, wherein
the control unit is further configured to perform control, based on a change in the parameter, to change processing of the sensing performed by the sensor.

7. The projection apparatus according to claim 6, wherein the parameter is at least any one of:
an adjustment value used for the image data in trapezoidal distortion correction processing,
an adjustment value used for the image data in geometric distortion correction processing,
an adjustment value used for the image data in enlargement processing, an adjustment value used for the image data in reduction processing, and an adjustment value for the position of the projection image.

8. The projection apparatus according to claim 1, wherein the sensor:
   (i) captures an image of a range including the projection image projected onto the projection surface to obtain a captured image, and
   (ii) detects the predetermined instruction based on the captured image.

9. The projection apparatus according to claim 8, wherein the sensor determines that the predetermined instruction is given in a case where a difference between an area corresponding to the predetermined display item in the projection image and an area corresponding to the predetermined display item in the captured image is greater than a predetermined difference.

10. The projection apparatus according to claim 1, further comprising:
    a communication unit configured to communicate with an output apparatus configured to output image data used by the projection unit to project the projection image, wherein
    the processing of changing image data is instructing the output apparatus to change image data output by the output apparatus via the communication unit.

11. A projection apparatus comprising:
    a projection unit including an optical system, the projection unit being configured to project a projection image including a predetermined display item onto a projection surface, and the optical system including a zoom optical system configured to optically control a size of the projection image on the projection surface;
    a detection unit configured to detect a zoom ratio of the zoom optical system;
    a sensor configured to sense a predetermined area corresponding to the predetermined display item on the projection surface; and
    a control unit configured to: (i) enable a predetermined function that uses an output of the sensor in a case where the predetermined display item is projected by the projection unit, and (ii) disable the predetermined function in a case where a change of the zoom ratio of the zoom optical system is greater than or equal to a predetermined amount while the predetermined display item is being projected by the projection unit, wherein the predetermined function is a function of changing image data used by the projection unit to project the projection image in response to the sensor detecting a predetermined instruction.

12. The projection apparatus according to claim 11, further comprising:
    a first position encoder configured to control the zoom ratio of the zoom optical system,
    wherein the detection unit is configured to detect the zoom ratio of the zoom optical system, based on an output value of the first position encoder.

13. The projection apparatus according to claim 11, wherein
    the optical system further includes a shift optical system configured to optically control a position of the projection image on the projection surface,
    the detection unit is configured to detect a shift amount of the shift optical system, and
    the control unit disables the predetermined function in a case where a change of a shift amount of the shift optical system is greater than or equal to a predetermined amount or more while the projection image including the predetermined display item is being projected.

14. The projection apparatus according to claim 13, further comprising:
    a second position encoder configured to control the shift amount of the shift optical system, wherein
    the detection unit is configured to detect the shift amount of the shift optical system, based on an output value of the second position encoder.

15. The projection apparatus according to claim 11, wherein the sensor is an imaging sensor configured to capture an image of a range including the projection image projected onto the projection surface to obtain a captured image.

16. The projection apparatus according to claim 11, further comprising:
    a communication unit configured to communicate with an output apparatus configured to output image data used by the projection unit to project the projection image, wherein
    the predetermined function is a function of sending information for changing image data used by the projection unit to project the projection image to the output apparatus via the communication unit.

17. A projection apparatus comprising:
    a projection unit including an optical system, the projection unit being configured to project a projection image including a predetermined display item onto a projection surface, and the optical system including a zoom optical system configured to optically control a size of the projection image on the projection surface;
    a detection unit configured to detect a zoom ratio of the zoom optical system;
    a sensor configured to sense a predetermined area corresponding to the predetermined display item on the projection surface;
    a sounding element; and
    a control unit configured to: (i) control execution of an operation relating to the projection image in response to the sensor detecting a predetermined instruction in the predetermined area, and (ii) control the sounding element to emit predetermined notification sound indicating a change of processing of the sensing in a case where a change of the zoom ratio of the zoom optical system is greater than or equal to a predetermined amount while the projection image is being projected, wherein the operation is an operation of changing image data used by the projection unit to project the projection image in response to the sensor detecting a predetermined instruction.

18. A method for controlling a projection apparatus including a projection unit including an optical system including a zoom optical system configured to optically control a size of the projection image on the projection surface, the projection unit being configured to project a projection image including a predetermined display item onto a projection surface, and a sensing unit configured to sense a predetermined area corresponding to the predetermined display item on the projection surface, the method comprising:
    detecting a zoom ratio of the zoom optical system;
    controlling execution of processing of changing image data used by the projection unit to project the projection image in response to the sensing unit detecting a predetermined instruction in the predetermined area; and stopping sensing performed by the sensing unit in response to a change of the zoom ratio of the zoom optical system being greater than or equal to a predetermined amount while the projection image including the predetermined display item is being projected.

19. A method for controlling a projection apparatus including a projection unit including an optical system including a zoom optical system configured to optically control a size of the projection image on the projection surface, the projection unit being configured to project a projection image including a predetermined display item onto a projection surface, and a sensor configured to sense a predetermined area corresponding to the predetermined display item on the projection surface, the method comprising:

detecting a zoom ratio of the zoom optical system;

enabling a predetermined function that uses an output of the sensor in a case where the predetermined display item is projected by the projection unit; and disabling the predetermined function in a case where a change of the zoom ratio of the zoom optical system is greater than or equal to a predetermined amount while the predetermined display item is being projected by the projection unit, wherein the predetermined function is a function of changing image data used by the projection unit to project the projection image in response to the sensor detecting a predetermined instruction.

20. A method for controlling a projection apparatus including a projection unit including an optical system including a zoom optical system configured to optically control a size of the projection image on the projection surface, the projection unit being configured to project a projection image including a predetermined display item onto a projection surface, a sensor configured to sense a predetermined area corresponding to the predetermined display item on the projection surface, and a sounding element, the method comprising:

detecting a zoom ratio of the zoom optical system;

controlling execution of an operation relating to the projection image in response to the sensor detecting a predetermined instruction in the predetermined area; and controlling the sounding element to emit predetermined notification sound indicating a change of processing of the sensing in a case where a change of the zoom ratio of the zoom optical system is greater than or equal to a predetermined amount while the projection image is being projected, wherein the operation is an operation of changing image data used by the projection unit to project the projection image in response to the sensor detecting a predetermined instruction.

21. A non-transitory storage medium storing at least one program causing a control method to be performed as a result of a processor of a projection apparatus reading and executing the at least one program, the projection apparatus including a projection unit including an optical system including a zoom optical system configured to optically control a size of the projection image on the projection surface, the projection unit being configured to project a projection image including a predetermined display item onto a projection surface, and a sensing unit configured to sense a predetermined area corresponding to the predetermined display item on the projection surface, the control method comprising:

detecting a zoom ratio of the zoom optical system;

controlling execution of processing of changing image data used by the projection unit to project the projection image in response to the sensing unit detecting a predetermined instruction in the predetermined area; and stopping sensing performed by the sensing unit in response to a change of the zoom ratio of the zoom optical system being greater than or equal to a predetermined amount while the projection image including the predetermined display item is being projected.

22. A non-transitory storage medium storing at least one program causing a control method to be performed as a result of a processor of a projection apparatus reading and executing the at least one program, the projection apparatus including a projection unit including an optical system including a zoom optical system configured to optically control a size of the projection image on the projection surface, the projection unit being configured to project a projection image including a predetermined display item onto a projection surface, and a sensor configured to sense a predetermined area corresponding to the predetermined display item on the projection surface, the control method comprising:

detecting a zoom ratio of the zoom optical system;

enabling a predetermined function that uses an output of the sensor in a case where the predetermined display item is projected by the projection unit; and disabling the predetermined function in a case where a change of the zoom ratio of the zoom optical system is greater than or equal to a predetermined amount while the predetermined display item is being projected by the projection unit, wherein the predetermined function is a function of changing image data used by the projection unit to project the projection image in response to the sensor detecting a predetermined instruction.

23. A non-transitory storage medium storing at least one program causing a control method to be performed as a result of a processor of a projection apparatus reading and executing the at least one program, the projection apparatus including a projection unit including an optical system including a zoom optical system configured to optically control a size of the projection image on the projection surface, the projection unit being configured to project a projection image including a predetermined display item onto a projection surface, a sensor configured to sense a predetermined area corresponding to the predetermined display item on the projection surface, and a sounding element, the control method comprising:

detecting a zoom ratio of the zoom optical system;

controlling execution of an operation relating to the projection image in response to the sensor detecting a predetermined instruction in the predetermined area; and controlling the sounding element to emit predetermined notification sound indicating a change of processing of the sensing in a case where a change of the zoom ratio of the zoom optical system is greater than or equal to a predetermined amount while the projection image is being projected, wherein the operation is an operation of changing image data used by the projection unit to project the projection image in response to the sensor detecting a predetermined instruction.

* * * * *